(12) United States Patent
Hunt et al.

(10) Patent No.: US 9,323,921 B2
(45) Date of Patent: Apr. 26, 2016

(54) ULTRA-LOW COST SANDBOXING FOR APPLICATION APPLIANCES

(75) Inventors: Galen C. Hunt, Bellevue, WA (US); Donald Porter, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 12/834,895

(22) Filed: Jul. 13, 2010

(65) Prior Publication Data

US 2012/0017213 A1    Jan. 19, 2012

(51) Int. Cl.
  G06F 9/46     (2006.01)
  G06F 9/44     (2006.01)
  G06F 7/04     (2006.01)
  G06F 15/177   (2006.01)
  G06F 21/53    (2013.01)

(52) U.S. Cl.
  CPC ..................................... G06F 21/53 (2013.01)

(58) Field of Classification Search
  USPC ...................................... 718/1–105; 726/1, 2
  See application file for complete search history.

(56) References Cited

U.S. PATENT DOCUMENTS

| | | | |
|---|---|---|---|
| 4,874,164 A | 10/1989 | Miner et al. | |
| 5,309,978 A | 5/1994 | Noble et al. | |
| 5,598,563 A | 1/1997 | Spies | |
| 5,689,626 A | 11/1997 | Conley | |
| 5,732,282 A | 3/1998 | Provino et al. | |
| 5,754,830 A | 5/1998 | Butts et al. | |
| 5,815,686 A | 9/1998 | Earl et al. | |
| 5,819,091 A | 10/1998 | Arendt et al. | |
| 5,922,056 A | 7/1999 | Amell et al. | |
| 5,926,631 A | 7/1999 | McGarvey | |
| 6,357,003 B1 | 3/2002 | Zarrin et al. | |
| 6,546,425 B1 | 4/2003 | Hanson et al. | |

(Continued)

FOREIGN PATENT DOCUMENTS

| | | | |
|---|---|---|---|
| CN | 13180610 | * | 11/2002 |
| CN | 1906560  | * | 1/2007  |

(Continued)

OTHER PUBLICATIONS

Lorch, Jacob R. and Smith, Alan Jay, "Building VTrace, a Tracer for Windows Nt and Windows 2000," University of califomia, Berkeley, Computer Science Division (EECS), Report No. UCB/CSD-00/1093, Feb. 2000, 18 pages.*

(Continued)

*Primary Examiner* — Abdullah Al Kawsar
(74) *Attorney, Agent, or Firm* — Alin Corie; Sandy Swain; Micky Minhas

(57) ABSTRACT

The disclosed architecture facilitates the sandboxing of applications by taking core operating system components that normally run in the operating system kernel or otherwise outside the application process and on which a sandboxed application depends on to run, and converting these core operating components to run within the application process. The architecture takes the abstractions already provided by the host operating system and converts these abstractions for use by the sandbox environment. More specifically, new operating system APIs (application program interfaces) are created that include only the basic computation services, thus, separating the basic services from rich application APIs. The code providing the rich application APIs is copied out of the operating system and into the application environment—the application process.

18 Claims, 8 Drawing Sheets

(56) References Cited

U.S. PATENT DOCUMENTS

| | | |
|---|---|---|
| 6,578,054 B1 | 6/2003 | Hopmann et al. |
| 6,665,731 B1 | 12/2003 | Kumar et al. |
| 6,668,376 B1 | 12/2003 | Wang et al. |
| 6,721,288 B1 | 4/2004 | King et al. |
| 6,813,670 B1 | 11/2004 | Yao et al. |
| 6,874,066 B2 | 3/2005 | Traversat et al. |
| 6,876,996 B2 | 4/2005 | Czajkowski et al. |
| 7,028,308 B2 | 4/2006 | Kim |
| 7,065,607 B2 | 6/2006 | England et al. |
| 7,185,359 B2 | 2/2007 | Schmidt et al. |
| 7,272,782 B2 | 9/2007 | Sneh |
| 7,275,105 B2 | 9/2007 | Bloch et al. |
| 7,287,259 B2 | 10/2007 | Grier et al. |
| 7,293,107 B1 | 11/2007 | Hanson et al. |
| 7,334,122 B2 | 2/2008 | Burokas et al. |
| 7,421,579 B2 | 9/2008 | England et al. |
| 7,444,337 B2 | 10/2008 | Zhou et al. |
| 7,493,626 B2 | 2/2009 | Resch |
| 7,496,495 B2 | 2/2009 | Solomon et al. |
| 7,502,823 B2 | 3/2009 | Garg et al. |
| 7,506,083 B1 | 3/2009 | Lemke et al. |
| 7,526,561 B2 | 4/2009 | Bloch et al. |
| 7,568,619 B2 | 8/2009 | Todd et al. |
| 7,574,208 B2 | 8/2009 | Hanson et al. |
| 7,574,709 B2 | 8/2009 | Erlingsson et al. |
| 7,596,783 B2 | 9/2009 | Huang et al. |
| 7,613,862 B2 | 11/2009 | Mihai |
| 7,627,728 B1 | 12/2009 | Roeck et al. |
| 7,640,009 B2 | 12/2009 | Belkin et al. |
| 7,644,264 B1 | 1/2010 | Olsen |
| 7,676,538 B2 | 3/2010 | Potter et al. |
| 7,685,593 B2 | 3/2010 | Solomon et al. |
| 7,694,187 B2 | 4/2010 | Souders et al. |
| 7,703,081 B1 | 4/2010 | Buches |
| 7,703,083 B2 | 4/2010 | Shi et al. |
| 7,725,613 B2 | 5/2010 | Bhardwaj et al. |
| 7,769,720 B2 | 8/2010 | Armington |
| 7,774,762 B2 | 8/2010 | Rochette et al. |
| 7,788,669 B2 | 8/2010 | England et al. |
| 7,812,985 B2 | 10/2010 | Nguyen et al. |
| 7,844,442 B2 * | 11/2010 | Tzruya ............................ 703/22 |
| 7,870,153 B2 | 1/2011 | Croft et al. |
| 7,882,247 B2 | 2/2011 | Sturniolo et al. |
| 7,886,183 B2 | 2/2011 | Krishnan et al. |
| 7,913,252 B2 | 3/2011 | Shlomai |
| 7,937,612 B1 | 5/2011 | Lyadvinsky et al. |
| 7,971,049 B2 | 6/2011 | TeNgaio |
| 7,990,823 B2 | 8/2011 | Tanaka et al. |
| 7,996,493 B2 | 8/2011 | Hill |
| 8,010,710 B2 | 8/2011 | Sumi |
| 8,019,861 B2 | 9/2011 | Ginzton |
| 8,060,656 B2 | 11/2011 | Hanson et al. |
| 8,065,444 B2 | 11/2011 | Lemke et al. |
| 8,074,231 B2 | 12/2011 | Hunt et al. |
| 8,117,554 B1 | 2/2012 | Grechishkin et al. |
| 8,131,919 B1 | 3/2012 | Gasser et al. |
| 8,135,877 B2 | 3/2012 | Wang |
| 8,150,971 B2 | 4/2012 | Lublin et al. |
| 8,195,774 B2 | 6/2012 | Lambeth et al. |
| 8,196,153 B1 | 6/2012 | de Cesare et al. |
| 8,214,849 B2 | 7/2012 | Cooper |
| 8,237,970 B2 | 8/2012 | Nguyen et al. |
| 8,285,987 B1 | 10/2012 | Kimball et al. |
| 8,346,983 B2 | 1/2013 | Lim et al. |
| 8,347,063 B2 | 1/2013 | Panesar et al. |
| 8,407,727 B2 | 3/2013 | Eom et al. |
| 8,418,236 B1 * | 4/2013 | Havemose ........................ 726/5 |
| 8,424,082 B2 | 4/2013 | Chen et al. |
| 8,429,654 B2 | 4/2013 | Chao et al. |
| 8,436,944 B2 | 5/2013 | Murase et al. |
| 8,453,253 B2 | 5/2013 | Strong et al. |
| 8,463,951 B1 | 6/2013 | Priem |
| 8,505,029 B1 | 8/2013 | Chanda et al. |
| 8,645,977 B2 | 2/2014 | Jacobson et al. |
| 8,903,705 B2 | 12/2014 | Douceur et al. |
| 2002/0019972 A1 | 2/2002 | Grier et al. |
| 2003/0208595 A1 | 11/2003 | Gouge et al. |
| 2003/0217174 A1 | 11/2003 | Dorenbosch et al. |
| 2003/0233404 A1 | 12/2003 | Hopkins |
| 2004/0015537 A1 | 1/2004 | Doerksen et al. |
| 2004/0168030 A1 | 8/2004 | Traversat et al. |
| 2004/0172629 A1 | 9/2004 | Tene et al. |
| 2004/0177243 A1 | 9/2004 | Worley, Jr. |
| 2005/0033980 A1 | 2/2005 | Willman et al. |
| 2005/0044534 A1 * | 2/2005 | Darweesh et al. ............ 717/124 |
| 2005/0060722 A1 | 3/2005 | Rochette et al. |
| 2005/0076186 A1 | 4/2005 | Traut |
| 2005/0080936 A1 | 4/2005 | Ray et al. |
| 2005/0091226 A1 | 4/2005 | Lin et al. |
| 2005/0102370 A1 | 5/2005 | Lin et al. |
| 2005/0108171 A1 | 5/2005 | Bajikar |
| 2005/0177635 A1 | 8/2005 | Schmidt |
| 2005/0187894 A1 | 8/2005 | Pletcher et al. |
| 2005/0198379 A1 | 9/2005 | Panasyuk et al. |
| 2005/0203962 A1 | 9/2005 | Zhou et al. |
| 2005/0240985 A1 | 10/2005 | Alkove et al. |
| 2006/0004927 A1 | 1/2006 | Rehman et al. |
| 2006/0005047 A1 | 1/2006 | Lekatsas et al. |
| 2006/0037072 A1 | 2/2006 | Rao et al. |
| 2006/0156418 A1 | 7/2006 | Polozoff |
| 2006/0161563 A1 | 7/2006 | Besbris et al. |
| 2006/0161982 A1 | 7/2006 | Chari |
| 2006/0184931 A1 | 8/2006 | Rochette et al. |
| 2006/0248208 A1 | 11/2006 | Walbeck et al. |
| 2006/0259734 A1 | 11/2006 | Sheu |
| 2006/0294518 A1 | 12/2006 | Richmond et al. |
| 2007/0061556 A1 | 3/2007 | Rothman et al. |
| 2007/0074191 A1 | 3/2007 | Geisinger |
| 2007/0078950 A1 | 4/2007 | Hopkins |
| 2007/0134068 A1 * | 6/2007 | Smith et al. ..................... 406/39 |
| 2007/0136579 A1 | 6/2007 | Levy et al. |
| 2007/0136723 A1 * | 6/2007 | Smith et al. ....................... 718/1 |
| 2007/0169116 A1 | 7/2007 | Gujarathi et al. |
| 2007/0174910 A1 | 7/2007 | Zachman et al. |
| 2007/0198657 A1 | 8/2007 | Saliba et al. |
| 2007/0244980 A1 | 10/2007 | Baker |
| 2007/0250838 A1 | 10/2007 | Belady et al. |
| 2007/0283324 A1 | 12/2007 | Geisinger |
| 2007/0288228 A1 | 12/2007 | Taillefer et al. |
| 2008/0005472 A1 * | 1/2008 | Khalidi et al. ................ 711/115 |
| 2008/0005794 A1 | 1/2008 | Inoue et al. |
| 2008/0016339 A1 | 1/2008 | Shukla |
| 2008/0028401 A1 | 1/2008 | Geisinger |
| 2008/0127182 A1 | 5/2008 | Newport et al. |
| 2008/0127225 A1 | 5/2008 | Mullis, et al. |
| 2008/0127348 A1 | 5/2008 | Largman et al. |
| 2008/0222160 A1 | 9/2008 | MacDonald et al. |
| 2008/0222628 A1 | 9/2008 | Batra et al. |
| 2008/0263531 A1 | 10/2008 | Perry et al. |
| 2008/0276012 A1 | 11/2008 | Mesa et al. |
| 2009/0024757 A1 | 1/2009 | Proctor |
| 2009/0064196 A1 | 3/2009 | Richardson et al. |
| 2009/0094337 A1 | 4/2009 | Dias |
| 2009/0204960 A1 | 8/2009 | Ben-Yehuda et al. |
| 2009/0204961 A1 | 8/2009 | DeHaan et al. |
| 2009/0210871 A1 | 8/2009 | Dechovich |
| 2009/0217047 A1 | 8/2009 | Akashika et al. |
| 2009/0222304 A1 | 9/2009 | Higgins et al. |
| 2009/0249051 A1 * | 10/2009 | TeNgaio et al. .................... 713/1 |
| 2009/0259993 A1 | 10/2009 | Konduri |
| 2009/0265706 A1 | 10/2009 | Golosovker et al. |
| 2009/0282266 A1 | 11/2009 | Fries et al. |
| 2009/0282404 A1 | 11/2009 | Khandekar et al. |
| 2009/0282474 A1 | 11/2009 | Chen et al. |
| 2009/0307781 A1 | 12/2009 | Iga et al. |
| 2009/0328225 A1 | 12/2009 | Chambers |
| 2010/0017461 A1 | 1/2010 | Kokkevis et al. |
| 2010/0017857 A1 | 1/2010 | Kramer |
| 2010/0023700 A1 | 1/2010 | Chen et al. |
| 2010/0031276 A1 | 2/2010 | Hsieh |
| 2010/0042636 A1 | 2/2010 | Lu |
| 2010/0042796 A1 | 2/2010 | Vasilevsky et al. |
| 2010/0042987 A1 | 2/2010 | Yamada |
| 2010/0082926 A1 | 4/2010 | Sahita et al. |

(56) References Cited

U.S. PATENT DOCUMENTS

| | | |
|---|---|---|
| 2010/0083015 A1 | 4/2010 | Yokota et al. |
| 2010/0115334 A1 | 5/2010 | Malleck et al. |
| 2010/0153659 A1 | 6/2010 | Lovell et al. |
| 2010/0158220 A1 | 6/2010 | Silverman |
| 2010/0169407 A1 | 7/2010 | Hsueh et al. |
| 2010/0169497 A1 | 7/2010 | Klimentiev et al. |
| 2010/0174833 A1 | 7/2010 | Filer et al. |
| 2010/0180275 A1 | 7/2010 | Neogi et al. |
| 2010/0185956 A1 | 7/2010 | Anantharaman et al. |
| 2010/0211663 A1* | 8/2010 | Barboy et al. ............... 709/223 |
| 2010/0211956 A1 | 8/2010 | Gopisetty et al. |
| 2010/0217853 A1 | 8/2010 | Alexander et al. |
| 2010/0262853 A1 | 10/2010 | Goda |
| 2010/0262977 A1* | 10/2010 | Havemose ................ 719/310 |
| 2010/0287263 A1 | 11/2010 | Liu et al. |
| 2010/0287548 A1 | 11/2010 | Zhou et al. |
| 2010/0287618 A1 | 11/2010 | Howell et al. |
| 2010/0293392 A1 | 11/2010 | Miyamoto |
| 2010/0306848 A1 | 12/2010 | Gellerich |
| 2010/0332629 A1 | 12/2010 | Cotugno et al. |
| 2011/0004878 A1 | 1/2011 | Divoux |
| 2011/0047376 A1 | 2/2011 | Mital |
| 2011/0119494 A1 | 5/2011 | Huang et al. |
| 2011/0162082 A1 | 6/2011 | Paksoy et al. |
| 2011/0191494 A1 | 8/2011 | Turanyi et al. |
| 2011/0191788 A1* | 8/2011 | Jacobson et al. ............ 719/328 |
| 2011/0202739 A1 | 8/2011 | Grisenthwaite |
| 2011/0231670 A1 | 9/2011 | Shevchenko et al. |
| 2011/0246551 A1 | 10/2011 | Giancaspro et al. |
| 2011/0257992 A1 | 10/2011 | Scantland et al. |
| 2011/0264788 A1 | 10/2011 | Costa |
| 2011/0276806 A1 | 11/2011 | Casper et al. |
| 2011/0277013 A1 | 11/2011 | Chinta |
| 2011/0296487 A1* | 12/2011 | Walsh .............................. 726/1 |
| 2011/0302330 A1 | 12/2011 | Cota-Robles et al. |
| 2011/0302415 A1 | 12/2011 | Ahmad et al. |
| 2011/0320520 A1 | 12/2011 | Jain |
| 2012/0005192 A1 | 1/2012 | Bao et al. |
| 2012/0036255 A1 | 2/2012 | Polsky |
| 2012/0036509 A1 | 2/2012 | Srinivasan et al. |
| 2012/0084562 A1 | 4/2012 | Farina et al. |
| 2012/0144042 A1 | 6/2012 | Lublin et al. |
| 2012/0159184 A1 | 6/2012 | Johnson et al. |
| 2012/0179485 A1 | 7/2012 | Saneii |
| 2012/0203932 A1 | 8/2012 | de Costa et al. |
| 2012/0222025 A1 | 8/2012 | Pandit |
| 2012/0227038 A1 | 9/2012 | Hunt |
| 2012/0227058 A1 | 9/2012 | Hunt |
| 2012/0227061 A1 | 9/2012 | Hunt et al. |
| 2012/0265742 A1 | 10/2012 | Burckhardt et al. |
| 2012/0291094 A9 | 11/2012 | Forrester et al. |
| 2012/0296626 A1 | 11/2012 | Bond et al. |
| 2012/0297249 A1 | 11/2012 | Yang et al. |
| 2013/0031371 A1 | 1/2013 | McLellan et al. |
| 2013/0036431 A1 | 2/2013 | Douceur et al. |
| 2013/0054734 A1 | 2/2013 | Bond et al. |
| 2013/0060947 A1 | 3/2013 | Nelson |
| 2013/0151846 A1 | 6/2013 | Baumann et al. |
| 2013/0151848 A1 | 6/2013 | Baumann et al. |
| 2013/0152209 A1 | 6/2013 | Baumann et al. |
| 2013/0232345 A1 | 9/2013 | Johnson et al. |
| 2013/0254884 A1* | 9/2013 | Dalcher et al. ................ 726/22 |
| 2016/0026488 A1 | 1/2016 | Bond et al. |

FOREIGN PATENT DOCUMENTS

| | | | |
|---|---|---|---|
| CN | 101174293 | * | 5/2008 |
| CN | 101448255 | * | 6/2009 |
| CN | 101632083 | * | 1/2010 |
| CN | 101655798 A | | 2/2010 |
| CN | 102077209 | * | 5/2011 |
| EP | 1526425 | * | 4/2005 |
| EP | 1925120 B1 | | 5/2005 |
| WO | WO2008/111049 | | 9/2008 |
| WO | 2011/027191 | | 3/2011 |

OTHER PUBLICATIONS

Chang, et al., "User-level Resource-constrained Sandboxing", Retrieved at << cs.nyu.edu/vijayk/papers/user-sandbox.pdf >>, Proceedings of the 4th conference on USENIX Windows Systems Symposium, vol. 4, Aug. 3-4, 2000.

Marosi, et al., "Using VirtualMachines in Desktop Grid Clients for Application Sandboxing", Retrieved at << coregrid.net/mambo/images/stories/TechnicalReports/tr-0140.pdf >>, CoreGRID Technical Report, No. TR-140, Aug. 31, 2008.

"Aquifer Application Services Platform Version 5.5", retrieved on Mar. 3, 2009 at <.sysmanagement.com/enterpriseProducts/overview.aspx>>, Systems Management Engineering 2003, 2 pages.

Azab et al., "SICE: A Hardware-Level Strongly Isolated Computing Environment for x86 Multi-core Platforms", CCS11, Oct. 17-21, 2011, Chicago, Illinois, 14 pages.

Bershad et al., "Extensibility, Safety and Performance in the SPIN Operating System", Proceedings of the fifteenth ACM symposium on Operating systems principles, Published Date: Dec. 3, 1995, 17 pages.

"Browser Swallows OS", retrieved on Mar. 3, 2009 at <<desktoplinux.com/news/NS2750645189.html>>, Ziff Davis Enterprise Holdings Inc., Dec. 1, 2008, 3 pages.

Chen, "Native Client: A Technology for Running Native Code on the Web", retrieved on Mar. 3, 2009 at <<google-code-updates.blogspot.com/2008/12/native-client-technology-for-running.html>>, Google Code Blog, Dec. 8, 2008, 21 pages.

Chernoff, et al., "DIGITAL FX!32 Running 32-Bit x86 Applications on Alpha NT", retrieved on Mar. 3, 2009 at <<citeseerx.ist.psu.edu/viewdoc/summary?doi=10.1.1.21.8607>>, Proceedings of the USENIX Windows NT Workshop, Seattle, WA., Aug. 1997, 8 pages.

Chiueh, et al., "Integrating Segmentation and Paging Protection for Safe, Efficient and Transparents Software Extensions", retrieved on Mar. 3, 2009 at <<.sigops.org/sosp99/slides/kernel/chiueh.ps>>, Computer Science Dept., State University of New York, NY., 22 pages.

Christodorescu et al., "Cloud Security Is Not (Just) Virtualization Security", CCSW09, Nov. 13, 2009, Chicago, Illinois, 6 pages.

Clark, et al., "Live Migration of Virtual Machines", retrieved on Mar. 3, 2009 at <<cl.cam.ac.uk/research/srg/netos/papers/2005-migration-nsdi-pre.pdf>>, 14 pages.

"CLOC Count Lines of Code", retrieved on Mar. 3, 2009 at <<cloc.sourceforge.net/>>, Northrop Grummam Corporation / Information Technology / IT Solutions, 2006-2009, 15 pages.

Condit, et al., "Beta-Diversity in Tropical Forest Trees", retrieved on Mar. 3, 2009 at <<students.washington.edu/timbillo/readings%20for%20peru/Condit%20et%20al.%20Science%202008%20beta%20diversity%20of%20tropical%20trees.pdf>>, Science 295, pp. 666-669, (2002).

Cox, et al., "A Safety-Oriented Platform for Web Applications", retrieved on Mar. 3, 2009 at <<cs.washington.edu/homes/gribble/papers/gribble-Tahoma.pdf>>, 15 pages.

"CVE-2003-0111", retrieved on Mar. 3, 2009 at <<cve.mitre.org/cgi-bin/cvename.cgi?name=CAN-2003-0111, Common Vulnerabilities and Exposures website, 2009, 1 page.

"CVE-2007-0043", retrieved on Mar. 3, 2009 at <cve.mitre.org/cgi-bin/cvename.cgi?name=CVE-2007-0043, Common Vulnerabilities and Exposures website, 2009, 1 page.

"CWE-Common Weakness Enumeration", retrieved on Mar. 3, 2009 at <<http://nvd.nist.gov/cwe.cfm>>, National Vulnerability Database, NIST, 3 pages.

"Debian Counting", retrieved on Mar. 3, 2009 at <<libresoft.dat.escet.urjc.es/debian-counting/>>, Grupo de Sistemas y Comunicaciones, Universidad Rey Juan Carlos, Mostoles, Madrid, Spain, 2004-2005, 1 page.

Erlingsson, et al., "XFI: Software Guards for System Address Spaces", retrieved on Mar. 3, 2009 at <<.cs.ucsd.edu/~mvrable/papers/2006-osdi-xfi.pdf>>, Microsoft Research, Silicon Valley, pp. 1-14.

(56) References Cited

OTHER PUBLICATIONS

Ford, et al., "Vx32: Lightweight, User-level Sandboxing on the x86", retrieved on Mar. 3, 2009 at <<pdos.csail.mit.edu/papers/vx32:usenix08/>>, Massachusetts Institute of Technology, 20 pages.

Ford, et al., "VXA: A Virtual Architecture for Durable Compressed Archives", retrieved on Mar. 3, 2009 at <<.pdos.csail.mit.edu/papers/vxa:fast05.pdf>>, Computer Science and Artificial Intelligence Laboratory, MIT, Mass., 14 pages.

Garfinkel et al., "Flexible OS Support and Applications for Trusted Computing", Proceedings of the 9th conference on Hot Topics in Operating Systems, May 2003, 6 pages.

Garfinkel et al., "Terra: A Virtual Machine-Based Platform for Trusted Computing", Proceedings of the nineteenth ACM symposium on Operating systems principles, Published Date: Oct. 22, 2003, 14 pages.

Garfinkel, et al., "Ostia: A Delegating Architecture for Secure System Call Interposition", retrieved on Mar. 3, 2009 at <<.isoc.org/isoc/conferences/ndss/04/proceedings/Papers/Garfinkel.pdf>>, Computer Science Department, Stanford University, CA., 15 pages.

Goldberg, et al., "A Secure Environment for Untrusted Helper Applications (Confining the Wily Hacker)", retrieved on Mar. 3, 2009 at <<.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.

"Gears Improving Your Web Browser", retrieved on Mar. 3, 2009 at <<http://gears.google.com/>>, Google 2008, 1 page.

Harren, et al., "Using Dependent Types to Certify the Safety of Assembly Code", retrieved on Mar. 3, 2009 at <<.cs.berkeley.edu/~necula/Papers/deptypes_sas05.pdf>>, Static Analysis Symposium (SAS) 2005, pp. 155-170.

Intel Cloud Builder Guide, "Intel Cloud Builders Guide to Cloud Design and Deployment on Intel Platforms", intel.com/en_US/Assets/PDF/general/icb_ra_cloud_computing_Parallels_TCP.pdf, Retrieved Date: Dec. 7, 2011, 19 pages.

Jackson, et al., "Protecting Browser State from Web Privacy Attacks", retrieved on Mar. 3, 2009 at <<portal.acm.org/citation.cfm?id=1135884>>, WWW 2006, May 23-26, 2006, Edinburgh, Scotland, pp. 737-744.

Kiciman, et al., "AjaxScope: A Platform for Remotely Monitoring the Client-Side Behavior of Web 2.0 Applications", retrieved on Mar. 3, 2009 at <<research.microsoft.com/en-us/projects/ajaxview/ajaxscope-sosp.pdf>>, SOSP 2007, Oct. 14-17, 2007, Stevenson, WA., 14 pages.

Ko et al., "TrustCloud: A Framework for Accountability and Trust in Cloud Computing", Published Jul. 8, 2011, 5 pages.

Kozuch, et al., "Internet Suspend/Resume", retrieved on Mar. 3, 2009 at <<intel-research.net/Publications/Pittsburgh/110620030912_88.pdf>>, Fourth IEEE Workshop on Mobile Computing Systems and Applications, Callicoon, NY, Jun. 2002, 8 pages.

"Live from CES: Hands on With Vista—Vista By The Numbers, A Developer Tells All", retrieved on Mar. 3, 2009 at <ces.gearlive.com/cesblog/article/live-from-ces-hands-on-with-vistamdashvista-by-the-numbers-0108051321/>>, 5 pages.

Livshits, et al., "Doloto: Code Splitting for Network-Bound Web 2.0 Applications", retrieved on Mar. 3, 2009 at <ftp.research.microsoft.com/pub/tr/TR-2007-159.pdf>>, Microsoft Research, pp. 1-25.

Lorch, et al., "The VTrace Tool: Building a System Tracer for Windows NT and Windows 2000", retrieved on Mar. 3, 2009 at <msdn.microsoft.com/en-us/magazine/cc302289(printer).aspx>>, Microsoft Corporation 2009, 10 pages.

McCamant, et al., "Evaluating SFI for a CISC Architecture", retrieved on Mar. 3, 2009 at <<groups.csail.mit.edu/pag/pubs/pittsfield-usenix2006.pdf>>, pp. 1-16.

McIlroy, "Mass Produced Software Components", retrieved on Mar. 3, 2009 at <dcs.gla.ac.uk/courses/teaching/mscweb/rrcs/papers/SE/McIlroy.pdf>>, 12 pages.

Microsoft, "Microsoft Application Virtualization (App-V)", accessible from microsoft.com/en-us/windows/enterprise/products-and-technologies/virtualization/app-v.aspx, obtained on Dec. 7, 2011, 2 pages.

Microsoft, "Performance Tuning Guidelines for Windows Server 2008 R2", Redmond, WA, May 16, 2011, 118 pages.

Morrisett, et al., "From System F to Typed Assembly Language", retrieved on Mar. 3, 2009 at <<cs.princeton.edu/~dpw/papers/taltoplas.pdf>>, Mar. 1999, pp. 1-41.

"Mozilla: The browser as operating system", retrieved on Mar. 3, 2009 at <<mathewingram.com/work/2008/08/26/mozilla-the-browser-as-operating-system/>>, Aug. 26, 2008, 8 pages.

Necula, et al., "CCured: Type-Safe Retrofitting of Legacy Software", retrieved on Mar. 3, 2009 at <<www.eecs.berkeley.edu/~necula/Papers/ccured_toplas.pdf>>, ACM Transactions on Programming Languages and Systems, vol. 27, No. 3, May 2005, 48 pages.

Necula, et al., "Safe Kernel Extensions Without Run-Time Checking", retrieved on Mar. 3, 2009 at <<citeseerx.ist.psu.edu/viewdoc/summary?doi=10.1.1.40.3010>>, Proceedings of the Second Symposium on Operating Systems Design and Implementation (OSDI 1996), Seattle, WA., Oct. 28-31, 1996, 15 pages.

"Open Source Software", retrieved on Mar. 3, 2009 at <<sourceforge.net>>, SourceForge, Inc., 1999-2009, 1 page.

"Outsource Web Enabling your Legacy Applications to O2I", retrieved on Mar. 3, 2009 at <<outsource2india.com/software/LegacySystems.asp>>, Flatworld Solutions Company, 2008, 7 pages.

Provos, "Improving Host Security with System Call Policies", retrieved on Mar. 3, 2009 at <<citi.umich.edu/u/provos/papers/systrace.pdf>>, Center for Information Technology Integration, University of Michigan, 15 pages.

Puder, "Extending Desktop Applications to the Web", retrieved on Mar. 3, 2009 at <<puder.org/publications/dorea04.pdf>>, San Francisco State University, Computer Science Department, 6 pages.

Purdy, et al., "Google Chrome as Future Operating System", retrieved on Mar. 3, 2009 at <lifehacker.com/5053069/google-chrome-as-future-operating-system>>, Sep. 22, 2008, 1 page.

Resig, "The Browser Operating System", retrieved on Mar. 3, 2009 at <<ejohn.org/blog/the-browser-operating-system/>>, Feb. 22, 2009, 5 pages.

Rinard, et al., "Enhancing Server Availability and Security Through Failure-Oblivious Computing", retrieved on Mar. 3, 2009 at <<web.mit.edu/droy/www/papers/osdi04.pdf>>, Computer Science and Artificial Intelligence Laboratory, MIT, Mass., 14 pages.

Sabin, "Strace for NT", retrieved on Mar. 3, 2009 at <<securityfocus.com/tools/1276>>, SecurityFocus 2007, 1 page.

Sapuntzakis, et al., "Optimizing the Migration of Virtual Computers", retrieved on Mar. 3, 2009 at <<suif.stanford.edu/collective/osdi02-optimize-migrate-computer.pdf>>, Computer Science Department, Stanford University, 14 pages.

"Secunia Advisories: SA7587", retrieved on Mar. 3, 2009 at <<ecunia.com/advisories/7587/>>, Secunia 2002-2009, 4 pages.

Swift, et al., "Improving the Reliability of Commodity Operating Systems", retrieved on Mar. 3, 2009 at <nooks.cs.washington.edu/nooks-tocs.pdf>>, University of Washington, pp. 1-33.

Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.

Szefer et al., "Eliminating the Hypervisor Attack Surface for a More Secure Cloud", published Oct. 17-21, 2011, CCS11, 12 pages.

Ta-Min et al., "Splitting Interfaces: Making Trust between Applications and Operating Systems Configurable", Proceedings of the 7th symposium on Operating systems design and implementation, Published Date: Nov. 2006, 14 pages.

"The Dojo Offline Toolkit", retrieved on Mar. 3, 2009 at <dojotoolkit.org/offline>>, The Dojo Foundation, 3 pages.

Tridgell, "Efficient Algorithms for Sorting and Synchronization", retrieved on Mar. 3, 2009 at <<samba.org/~tridge/phd_thesis.pdf>>, Australian National University, Feb. 1999, 115 pages.

Wahbe, et al., "Efficient Software-Based Fault Isolation", retrieved on Mar. 3, 2009 at <<crypto.stanford.edu/cs155/papers/sfi.pdf>>, SIGOPS 1993/12/93/N.C., USA, pp. 203-216.

"What is JPC?", retrieved on Mar. 3, 2009 at <<jpc.physics.ox.ac.uk/>>, Oxford University, 2004-2007, 2 pages.

Whitaker, et al., "Danali: Lightweight Virtual Machines for Distributed and Networked Applications", retrieved on Mar. 3, 2009 at

(56) References Cited

OTHER PUBLICATIONS

<<denali.cs.washington.edu/pubs/distpubs/papers/denali_usenix 2002.pdf>>, University of Washington, 14 pages.
"Windows Driver Kit", retrieved on Mar. 3, 2009 at <<microsoft.com/whdc/devtools/wdk/default.mspx>>, Microsoft Corporation 2009, 2 pages.
"WineHQ", retrieved on Mar. 3, 2009 at <<winehq.org/>>, 3 pages.
Witchel, et al., "Mondrix: Memory Isolation for Linux using Mondriaan Memory Protection", retrieved on Mar. 3, 2009 at <cag.lcs.mit.edu/scale/papers/mmp-sosp2005.pdf>>, SOSP 2005, Oct. 23-26, 2005, Brighton, UK, 14 pages.
Levasseur, et al., "Pre-Virtualization: Slashing the Cost of Virtualization", University of Karlsruhe, Germany, IBM T.J. Watson Research Center, New York National ICT Australia University of New South Wales, Australia, 2005; 15 pages.
"Sun Ray Ultra-Thin Clients in Technical Computing", retrieved on Oct. 11, 2010 at <<sun-rays.org/lib/hardware/sunray/ds/sunray_tc.pdf>>, Sun Microsystems, Inc., Datasheet, 2003, 2 pages.
"User-Mode Driver Framework (UMDF)", Microsoft Windows, retrieved on Aug. 4, 2011 at <<msdn.microsoft.com/en-us/windows/hardware/gg463294.aspx>>, 1 page.
Vaarala, "Security Considerations of Commodity x86 Virtualization", Helsinki University of Technology Telecommunications Software and Multimedia Laboratory, May 22, 2006; 150 pages.
"Windows User Mode Driver Framework", From Wikipedia, the free encyclopedia, Retrieved on Aug. 4, 2011 at <<en.wikipedia.org/wiki/User-Mode_Driver_Framework>>, 2 pages.
Wood, et al., "CloudNet: Dynamic Pooling of Cloud Resources by Live WAN Migration of Virtual Machines", VEE'11, Mar. 9-11, 2011, Newport Beach, California, 12 pages.
Zhang, et al., "A CORBA Trader-based Dynamic Binding Infrastructure in Pervasive Computing", International Symposium on Pervasive Computing and Applications, 2006, pp. 12-16.
"Amazon Elastic Compute Cloud (EC2)", maluke.com, accessible from http://www.maluke.com/blog/amazon-elastic-compute-cloud-ec2, obtained on Dec. 5, 2011, 2 pages.
Ammons et al., "Libra: A Library OS for a JVM in a Virtualized Execution Environment", In Proceedings of the 3rd International Conference on Virtual Execution Environments, Jun. 13-15, 2007, 11 pages.
Anderson, "The Case for Application-specific Operating Systems", In Proceedings of the 3rd Workshop on Workstation Operating Systems, Apr. 23-24, 1992, 3 pages.
Appavoo et al., "Providing a Linux API on the Scalable K42 Kernel", In Proceedings of the 2003 USENIX Annual Technical Conference, Jun. 9-14, 2003, 14 pages.
Barham et al., "Xen and the Art of Virtualization", In Proceedings of the 19th ACM Symposium on Operating Systems Principles, Oct. 19-22, 2003, 14 pages.
Baumann et al., "The Multikernel: A New OS Architecture for Scalable Multicore Systems", In Proceedings of the 22nd ACM Symposium on Operating Systems Principles, Oct. 11-14, 2009, 15 pages.
Bhattiprolu et al., "Virtual Servers and Checkpoint/Restart in Mainstream Linux", SIGOPS Operating Systems Review, Jul. 2008, 10 pages.
Bugnion et al., "Disco: Running Commodity Operating Systems on Scalable Multiprocessors", ACM Transactions on Computer Systems, vol. 15, No. 4, Nov. 1997, 36 pages.
Chen et al., "Setuid Demystified", In Proceedings of the 11 th USENIX Security Symposium, Aug. 5-9, 2002, 20 pages.
Cheriton et al., "A Caching Model of Operating System Kernel Functionality", In Proceedings of the 1st USENIX Symposium on Operating Systems Design and Implementation, Nov. 1994, 15 pages.
Douceur et al., "Leveraging Legacy Code to Deploy Desktop Applications on the Web", In Proceedings of the 8th USENIX Symposium on Operating Systems Design and Implementation, Dec. 2008, pp. 339-354.
Eiraku et al., "Fast Networking with Socket Outsourcing in Hosted Virtual Machine Environments", In Proceedings of the 24th ACM Symposium on Applied Computing, Mar. 8-12, 2009, 8 pages.
Engler et al., "Exokernel: An Operating System Architecture for Application-level Resource Management", In Proceedings of the 15th ACM Symposium on Operating Systems Principles, Dec. 3-6, 1995, 16 pages.
Franke et al., "Fuss, Futexes and Furwocks: Fast Userlevel Locking in Linux", In Proceedings of the Ottawa Linux Symposium, Jul. 11-14, 2010, 19 pages.
Garfinkel, "Traps and Pitfalls: Practical Problems in System Call Interposition Based Security Tools", Proceedings of the Network and Distributed Systems Security Symposium, Feb. 6-7, 2003, 14 pages.
Gupta et al., "Difference Engine: Harnessing Memory Redundancy in Virtual Machines", In Proceedings of the 8th USENIX Symposium on Operating Systems Design and Implementation, Dec. 8-10, 2008, 14 pages.
Helander, "Unix Under Mach: The Lites Server", Helsinki University of Technology, Helsinki, Dec. 30, 1994, 71 pages.
Howell et al., "Living Dangerously: A Survey of Software Download Practices", Microsoft Research, May 2010, 16 pages.
Leslie et al, "The Design and Implementation of an Operating System to Support Distributed Multimedia Applications", IEEE Journal on Selected Areas in Communications, May 1996, 18 pages.
Litzkow et al., "Checkpoint and Migration of UNIX Processes in the Condor Distributed Processing System", University of Wisconsin Madison, Apr. 1997, 9 pages.
Loscocco et al., "Integrating Flexible Support for Security Policies into the Linux Operating System", In Proceedings of the 2001 USENIX Annual Technical Conference, Feb. 2001, 62 pages.
Love, "Get on the D-BUS", Linux Journal, accesible from http://www.ee.ryerson.ca/~courses/coe518/LinuxJournal/elj2005-130-D-BUS.pdf, obtained on Jun. 18, 2006, 5 pages.
Malan et al., "DOS as a Mach 3.0 Application", In Proceedings of the USENIX Mach Symposium, Nov. 1991, 14 pages.
Microsoft, "Remote Desktop Protocol: Basic Connectivity and Graphics Remoting Specification", Redmond, WA, release: Sep. 20, 2011, 417 pages.
Roscoe et al., "Hype and Virtue", In Proceedings of the 11th USENIX Workshop on Hot Topics in Operating Systems, Aug. 2007, 6 pages.
Sapuntzakis et al., "Virtual Appliances for Deploying and Maintaining Software", In Proceedings of the Large Installation Systems Administration Conference, Oct. 2003, 15 pages.
Soltesz et al., "Container-based Operating System Virtualization: A Scalable, High-performance Alternative to Hypervisors", In Proceedings of the 2nd ACM SIGOPS/EuroSys European Conference on Computer Systems, Mar. 21-23, 2007, 13 pages.
Spear et al., "Solving the Starting Problem: Device Drivers as Self-describing Artifacts", In Proceedings of the EuroSys 2006 Conference, Apr. 18-21, 2006, 13 pages.
Sugerman et al., "Virtualizing I/O Devices on VMware Workstations Hosted Virtual Machine Monitor", In Proceedings of the 2001 USENIX Annual Technical Conference, Jun. 25-30, 2001, 15 pages.
Tucker, et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
VMWare ThinApp, "Application Virtualization Made Simple", accessible from http://www.vmware.com/products/thinapp/overview.html, data sheet obtained on Aug. 29, 2012, 2 pages.
Waldspurger, "Memory Resource Management in VMware ESX Server", retrieved on Mar. 3, 2009 at <<http://www.waldspurger.org/carl/papers/esx-mem-osdi02.pdf>>, Proc. Fifth Symposium on Operating Systems Design and Implementation (OSDI 2002), Dec. 2002, pp. 1-14.
Whitaker et al., "Scale and Performance in the Denali Isolation Kernel", In Proceedings of the 5th USENIX Symposium on Operating Systems Design and Implementation, Dec. 9-11, 2002, 15 pages.
Yee et al., "Native Client: A Sandbox for Portable, Untrusted x86 Native Code", In Proceedings of the 30th IEEE Symposium on Security and Privacy, May 17-20, 2009, 15 pages.
Zeldovich et al., "Making Information Flow Explicit in Histar", In Proceedings of the 8th USENIX Symposium on Operating Systems Design and Implementation, Nov. 2006, 16 pages.

(56) References Cited

OTHER PUBLICATIONS

Celesti et al., "Improving Virtual Machine Migration in Federated Cloud Environments", Second International Conference on Evolving Internet, Published date: Sep. 20-25, 2010, pp. 61-67.
Chahal et al., "Testing Live Migration with Intel Virtualization Technology FlexMigration", Intel Information Technology, Jan. 2009, 12 pages.
Haff, "RingCube brings 'containers' to the client", CNET News, Feb. 6, 2009, 3 pages.
Jobs, S.; "Keynote Address", Apple Worldwide Developers Conference, Aug. 2006, 3 pages.
Microsoft-Tech Net, "Device Management and Installation Step-by-Step Guide", retrieved on Apr. 14, 2011 at <<technet.microsoft.com/en-us/library/dd919230%28WS.10%29.aspx>>, 2 pages.
Mihocka et al., "Virtualization Without Direct Execution or Jitting: Designing a Portable Virtual Machine Infrastructure", retrieved at bochs.sourceforge.net/Virtualization_Without_Hardware_Final. PDF, Jun. 21, 2008, 16 pages.
Final Office Action for U.S. Appl. No. 12/463,892, mailed on Jun. 14, 2012, Jonathan R. Howell et al., "Executing Native-Code Applications in a Browser", 15 pages.
Non-Final Office Action for U.S. Appl. No. 12/463,892, mailed on Dec. 6, 2011, Jonathan R. Howell et al., "Executing Native-Code Applications in a Browser", 21 pages.
OSdata.com, "Maintenance and Administration," retrieved on Apr. 14, 2011 at <<osdata.com/holistic/maintain/maintain.htm>>, 8 pages.
Piotrowski, et al., "Virtics: A System for Privilege Separation of Legacy Desktop Applications"; EECS Department, University of California at Berkeley, Technical Report No. UCB/EECS-2010-70, May 13, 2010, pp. 1-21.
Porter et al., "Rethinking the Library OS from the Top Down", ASPLOS' 11, Mar. 5-11, 2011, Newport Beach, California, pp. 291-305.
Smith, Roderick W., "Using QEMU for cross-platform development", retrieved at ibm.com/developerworks/linux/library/l-qemu-development/?ca=drs-, Feb. 9, 2010, 7 pages.
Stokely, "The FreeBSD Handbook", 3rd Edition, vol. 1: User's Guide, FreeBSD Mall, Inc., Brentwood, CA., 2003, 408 pgs.
Tan, et al.; "iKernel: Isolating Buggy and Malicious Device Drivers Using Hardware Virtualization Support"; Proceedings of the Third IEEE International Symposium on Dependable, Autonomic and Secure Computing; 2007; pp. 134-144.
Tucker et al., "Solaris Zones: Operating System Support for Server Consolidation", In Proceedings of the Large Installation Systems Administration Conference, Nov. 2004, 2 pages.
Condit, et al., "Beta-Diversity in Tropical Forest Trees", Science; vol. 295, Jan. 25, 2002, pp. 666-669.
U.S. Appl. No. 13/107,973; including O / A's dated Oct. 25, 2013, Jun. 10, 2013, and Dec. 21, 2013, and any future O / A's, filed May 16, 2011, Bond et al.
Microsoft Corporation, "Internet Information Services 7.5", Retrieved at: <<http://technet.microsoft.com/en-us/ library/dd364124(WS.10).aspx>>, Mar. 24, 2009, pp. 43.
Microsoft Computer Dictionary, Fifth Edition, Microsoft Press, A Division of Microsoft Corporation, One Microsoft Way Redmond, WA, 98052-6399, Copyright 2002 by Microsoft Corporation.
Allen, Jennifer, "Windows Vista Application Development Requirements for User Account Control Compatability", Retrieved From: <<http://msdn.microsoft.com/en-us/library/bb530410.aspx>>, Jun. 2007, 27 pages.
Bagchi, Susmit, "On Reliable Distributed IPC/RPC Design for Interactive Mobile Applications", 2010 ACM 978-1-4503-0047, Jun. 10, 2010, pp. 33-38.
Charles, "Mark Russinovich: Inside Windows 7" Retrieved at: <<http://channel9.msdn.com/show/going+deep/Mark-Russinovich-Inside-Windows-7>>, Jan. 14, 2009, 12 pages.

Gregg et al., "Overview of IBM zEnterprise 196 I/O Subsystem with Focus on New PCI Express Infrastructure", IBM, Journal of Research and Development, vol. 56, No. 1 and 2 Paper 8, Jan./Mar. 2012, pp. 8:1-8:14.
Kobayashi, et al., "Quick Reboot-Based Recovery for Commodity Operating Systems in Virtualized Server Consolidation", Retrieved Date: Sep. 15, 2011, pp. 6.
Parno et al., "Memoir: Practical State Continuity for Protected Modules", in Proceedings of the IEEE Symposium on Security and Privacy, IEEE, May 2011.
Wang et al., "Protection and Communication Abstractions for Web Browsers in MashupOS", SOS 2007, 15 pages.
Yu et al., "A Feather-Weight Virtual Machine for Windows Applications", VEE'06, 2006, 11 pages.
Zhou et al., "Flexible On-Device Service Object Replication with Replets", Proceedings of the 13th International Conference on World Wide Web. ACM, 2004, 12 pages.
International Search Report, Mailed Date: Oct. 30, 2012, Application No. PCT/US/2012/027635, Filed Date: Mar. 3, 2012, pp. 9.
Verizon Wireless, "Escaping from Microsoft's Protected Mode Internet Explorer—Evaluating a Potential Security Boundary", White Paper, Nov. 10, 2011, 8 pages.
Office Action for U.S. Appl. No. 13/196,235, Mailed on Jul. 3, 2014, Douceur, et al.
Response to Office Action for U.S. Appl. No. 13/196,235 Mailed on Apr. 9, 2014, Filed Jun. 12, 2014, Douceur et al.
Office Action for U.S. Appl. No. 12/972,081, Mailed on Apr. 5, 2013, Douceur et al.
Office Action for U.S. Appl. No. 12/972,081, Mailed on Sep. 10, 2013, Douceur, et al., 18 pages.
Office Action for U.S. Appl. No. 12/972,081, Mailed on Apr. 17, 2014, Douceur, et al., 27 pages.
Office Action for U.S. Appl. No. 13/196,235 Mailed on Apr. 8, 2013, Douceur et al.
Office Action for U.S. Appl. No. 13/196,235 Mailed on Apr. 9, 2013, Douceur et al., 34 pages.
Office Action for U.S. Appl. No. 13/196,235, Mailed on Oct. 15, 2013, Douceur, et al., 29 pages.
Response to Office Action for U.S. Appl. No. 13/196,235, Mailed on Oct. 15, 2013, Filed Mar. 17, 2014, Douceur, et al.
Response to Office Action for U.S. Appl. No. 12/972,081, Mailed on Sep. 10, 2013, Filed: Jan. 10, 2014, Douceur, et al.
Office Action for U.S. Appl. No. 13/345,031 Mailed on Nov. 6, 2013, Hunt, et al., 8 pages.
Response to Office Action for U.S. Appl. No. 12/972,081, Mailed on Apr. 5, 2013, Filed: Aug. 8, 2015, Douceur et al.
Office Action for U.S. Appl. No. 13/314,512 Mailed on Jul. 30, 2013, Hunt, et al., 19 pages.
Response to Office Action for U.S. Appl. No. 13/196,235 Mailed on Apr. 8, 2013, Filed: Jul. 8, 2013, Douceur et al.
Response to Office Action for U.S. Appl. No. 12/972,081, Mailed on Apr. 17, 2014, Filed: Douceur, et al.
International Search Report and Written Opinion for PCT Application No. PCT/US2012/067660, Mailed Date: Mar. 20, 2013.
International Search Report and Written Opinion for PCT Application No. PCT/US2012/067662, Mailed Date: Mar. 11, 2013.
Response to Office Action for U.S. Appl. No. 13/314,512 Mailed on Jul. 30, 2013, Filed: May 4, 2014, Hunt, et al.
Whitaker et al., "Denali Lightweight Virtual Machines and Networked Applications", in Proceedings of the USENIX Annual Technical Conference, Dec. 17, 2002, 14 Pages.
Sahita et al., "Beyond Ring-3: Fine Grained Application Sandboxing" W3C Workshop on Security for Access to Device APIs from the Web, 10-11 Dec. 2008, 5 Pages.
Vaughan-Nichols, Steven J., "New Approach to Virtualization is a Lightweight" From Lee Garber, Computer, l.garber@computer.org, Nov. 2006. 3 Pages.
CN Office Action Mailed Jan. 28, 2015 for China Patent Application No. 201210537282.X, 15 pages.
Request for Continued Examination and Response to Final Office Action Filed Jan. 21, 2014 for U.S. Appl. No. 13/372,390. 19 Pages.
Office Action Mailed Dec. 14, 2014 for U.S. Appl. No. 13/372,390. 16 Pages.

(56) References Cited

OTHER PUBLICATIONS

Office Action Mailed Oct. 10, 2014 for European Patent Application No. 12858587.4. 7 Pages.
Response to Office Action Filed Feb. 23, 2015 for European Patent Application No. 12858587.4. 11 Pages.
Office Action Mailed Dec. 19, 2014 for U.S. Appl. No. 13/372,390. 45 Pages.
U.S. Appl. No. 12/463,892, Restriction Requirement, Mailed Date: Sep. 29, 2011, 6 pages.
U.S. Appl. No. 12/463,892, Response to Restriction Requirement, Filed Date: Oct. 31, 2011, 9 pages.
U.S. Appl. No. 12/463,892, Non-Final Office Action, Mailed Date: Dec. 6, 2011, 21 pages.
U.S. Appl. No. 12/463,892, Amendment, Filed Date: May 7, 2012, 10 pages.
U.S. Appl. No. 12/463,892, Response to Non-Final Office Action for U.S. Appl. No. 12/463,892, Mailed Date: Dec. 6, 2011, Filed Date: May 7, 2012, 10 pages.
U.S. Appl. No. 12/463,892, Final Office Action, Mailed Date: Jun. 14, 2012, 15 pages.
U.S. Appl. No. 12/463,892, Notice of Appeal, Filed Date: Nov. 14, 2012, 1 page.
U.S. Appl. No. 12/463,892, Appeal Brief, Filed Date: Jan. 14, 2013, 24 pages.
U.S. Appl. No. 12/463,892, Examiner's Answer to Appeal Brief, Mailed Date: Feb. 19, 2013, 9 pages.
U.S. Appl. No. 12/463,892, Reply Brief, Filed Date: Apr. 19, 2013, 5 pages.
U.S. Appl. No. 13/107,973, Non-Final Office Action, Mailed on Dec. 21, 2012, Bond, 13 pages.
U.S. Appl. No. 13/107,973, Response to Non-Final Office Action, Filed date: Apr. 22, 2013, Bond, 14 pages.
U.S. Appl. No. 13/107,973, Final Office Action, Mailed on Jun. 10, 2013, Bond, 15 pages.
U.S. Appl. No. 13/107,973, Request for Continued Examination and Response to Final Office Action, Filed date: Sep. 24, 2013, Bond, 17 pages.
U.S. Appl. No. 13/107,973, Non-Final Office Action, Mailed on Oct. 25, 2013, Bond, 13 pages.
U.S. Appl. No. 13/107,973, Response to Non-Final Office Action, Filed Date: Jan. 23, 2014, Bond, 15 pages.
U.S. Appl. No. 13/107,973, Non-Final Office Action, Mailed on May 21, 2014, Bond, 9 pages.
U.S. Appl. No. 13/107,973, Response to Non-Final Office Action, Filed date: Oct. 21, 2014, Bond, 10 pages.
U.S. Appl. No. 13/107,973, Notice of Allowance, Mailed on Nov. 21, 2014, Bond, 9 pages.
U.S. Appl. No. 13/215,244, Non-Final Office Action, Mailed Date: Feb. 28, 2014, 15 pages.
U.S. Appl. No. 13/215,244, Response to Non-Final Office Action, Filed Date: May 28, 2014, 12 pages.
U.S. Appl. No. 13/215,244, Final Office Action, Mailed Date: Sep. 26, 2014, 18 pages.
U.S. Appl. No. 13/215,244, Response to Final Office Action, Filed Date: Nov. 26, 2014, 14 pages.
U.S. Appl. No. 13/215,244, Advisory Action, Mailed Date: Dec. 12, 2014, 8 pages.
Fischer, Donald, "Red Hat Enterprise Linux 4 Application Compatability", Feb. 2005, pp. 1-12.
U.S. Appl. No. 13/314,512, Response to Office Action, Filed: Apr. 2, 2014, 10 pages.
U.S. Appl. No. 13/314,512, Final Office Action, Mailed on Jul. 15, 2014, Hunt, et al., 29 pages.
Vaughan-Nichols, Steven J., "New Approach to Virtualization is a Lightweight", IEEE, Computer, vol. 39, Issue 11, Nov. 2006, pp. 12-14.
U.S. Appl. 13/345,031, Response to Non-Final Office Action, Filed date: May 4, 2014, 8 pages.
U.S. App. No. 13/345,031, Notice of Allowance, Mailed on Jul. 8, 2014, 5 pages.

"NPL Search Results 13/196235", Elsevier Eng. Info. Inc., 2013, 23 pages.
U.S. Appl. No. 13/323,562, "Non-Final Office Action", Mailed on May 8, 2013, 12 pages.
U.S. Appl. No. 13/323,562, "Response to Non-Final Office Action", Filed: Aug. 21, 2013, 8 pages.
U.S. Appl. No. 13/323,562, "Final Office Action", Mailed on Oct. 23, 2013, 16 pages.
U.S. Appl. No. 13/323,562, "Response to Non-Final Office Action", Filed date: Jan. 23, 2014, 25 pages.
U.S. Appl. No. 13/323,562, Notice of Allowance. Mailed on May 19, 2014, 14 pages.
U.S. Appl. No. 13/323,562, "Request for Continued Examination", Filed date: May 23, 2014, 3 pages.
U.S. Appl. No. 13/323,465, Non-Final Office Action, Mailed date: Sep. 13, 2013, 15 pages.
U.S. Appl. No. 13/323,465, "Applicant Initiated Interview Summary", Mailed date: Oct. 29, 2013, 3 pages.
U.S. Appl No. 13/323,465, Response to Non-Final Office Action, Filed date: Dec. 30, 2013, 8 pages.
U.S. Appl. No. 13/323,465, Final Office Action, Mailed date: Mar. 12, 2014, 27 pages.
U.S. Appl. No. 13/323,465, Request for Continued Examination and Response to Final Office Action, Filed date: Jun. 12, 2014, 19 pages.
U.S. Appl. No. 13/372,390, Response to Non-Final Office Action, Filed date: May 30, 2013, 19 pages.
U.S. Appl. No. 13/372,390, Final Office Action, mailed on Sep. 19, 2013, 20 pages.
U.S. Appl. No. 13/372,390, Request for Continued Examination and Response Final Office Action, Filed date: Jan. 21, 2014, 16 pages.
Supplementary European Search Report, for European Patent Application No. 12858587.4, Mailed Sep. 3, 2014, 3 pages.
European Office Action, for European Patent Application No. 12858587.4, mailed Oct. 21, 2014, 7 pages.
Second Office Action mailed Aug. 21, 2015 from Chinese Patent Application No. 201210533610.9, 10 pages.
Farsi, M., "CANOpen Communication", Proceedings of Drives and Controls, Mar. 5-7, 1996, INSPEC Abstract Retrieved on-line from Dialog, 1 page.
Hac, A., "Network Time Slots Allocation by Using a Time Multiplexed Switch in a Telecommunications Architecture", Singapore ICCS '94, Nov. 14-18, 1994, pp. 1149-1153, 5 pages.
Hwang et al., "ATM-Based Plug-and-Play Technique for In-home Networking", Electronic Letters, Oct. 29, 1988, vol. 34, No. 22, pp. 2088-2090, 3 pages.
Mallipeddi et al., "Ensemble Strategies in Compact Differential Evolution", 2011 IEEE Congress of Evolutionary Computation, CEC 2011, Jun. 5-6, 2011, pp. 1972-1977, 6 pages.
Portoles et al., "IEEE 802.11 Downlink Traffic Shaping Scheme for Multi-User Service Enhancement", 14th IEEE 2003 International Symposium on Personal, Indoor and Mobile Radio Communications, PIMRC2003, Sep. 9-10, 2003, pp. 1712-1716, 5 pages.
Quinn et al., "Neutron Sensitivity of High-Speed Networks", IEEE Transactions on Nuclear Science, vol. 57, No. 6, Dec. 2010, pp. 3547-3552, 6 pages.
Tanaka, H., "Run-time Updating of Network Device Drivers", NBiS 2009—12th International Conference on Network-Based Information Systems, Aug. 19-21, 2009, pp. 446-450, 5 pages.
Applicant-Initiated Interview Summary mailed Feb. 9, 2012 from U.S. Appl. No. 12/463,892, 3 pages.
Notice of Allowance mailed Mar. 13, 2015 from U.S. Appl. No. 13/107,973, 9 pages.
Non-Final Office Action mailed Feb. 23, 2015 from U.S. Appl. No. 13/215,244, 22 pages.
Response filed Jun. 20, 2015 to Non-Final Office Action mailed Feb. 23, 2015 from U.S. Appl. No. 13/215,244. 15 pages.
Supplementary Search Report mailed Oct. 27, 2014 from European Patent Application No. 12752531.9, 9 pages.
Response filed Jan. 15, 2015 to Final Office Action mailed Jul. 15, 2014 from U.S. Appl. No. 13/314,512, 12 pages.
Non-Final Office Action mailed Jun. 25, 2015 from U.S. Appl. No. 13/314,512, 14 pages.

(56) References Cited

OTHER PUBLICATIONS

Office Action mailed Nov. 13, 2014 from European Patent Application No. 12752531.9, 1 page.
Response filed May 15, 2015 to Office Action mailed Nov. 13. 2014 from European Patent Application No. 12752531.9, 18 pages.
Non-Final Office Action mailed Dec. 22, 2014 from U.S. Appl. No. 13/331,078, 8 pages.
Response, filed May 22, 2015 to Non-Final Office Action mailed Dec. 22, 2014 from U.S. Appl. No. 13/331,078, 9 pages.
Preliminary Amendment filed Feb. 13, 2012 from U.S. Appl. No. 13/323,562, 3 pages.
Notice of Allowance mailed Feb. 11, 2015 from U.S Appl. No. 13/323,562, 10 pages.
Office Action mailed Jan. 28, 2015 from Chinese Patent Application No. 201210537282.X, 19 pages.
Office Action mailed May 27, 2015 from European Patent Application No. 12858489.3, 5 pages.
Non-Final Office Action mailed Sep. 13, 2013 from U.S. Appl. No. 13/323,465, 16 pages.
Final Office Action mailed Mar. 12, 2014 from U.S. Appl. No. 13/323,465, 20 pages.
Non-Final Office Action mailed Mar. 26, 2015 from U.S. Appl. No. 13/323,465, 28 pages.
Response filed Jun. 16, 2015 to Non-Final Office Action mailed Mar. 26, 2015 from U.S. Appl. No. 13/323,465, 17 pages.
Non-Final Office Action mailed Mar. 12, 2013 from U.S. Appl. No. 13/372,390, 17 pages.
Response filed Jun. 18, 2015 to Non-Final Office Action mailed Dec. 19, 2014 from U.S. Appl. No. 13/372,390, 36 pages.
First Office Action mailed Dec. 3, 2014 from Chinese Patent Application No. 201210533610.9, 19 pages.
Response filed Jul. 2, 2015 to the Office Action mailed May 27, 2015 from European Patent Application No. 12858489.3, 11 pages.
Final Office Action mailed Jul. 16, 2015 from U.S. Appl. No. 13/331,078, 10 pages.
Final Office Action mailed Jul. 22, 2015 from U.S. Appl. No. 13/323,465, 29 pages.
Final Office Action mailed Jul. 22, 2015 from U.S. Appl. No. 13/372,390, 24 pages.
Examiner Interview Summary mailed Jun. 25, 2015 from U.S. Appl. No. 13/314,512, 1 page.
Notice of Allowance mailed Aug. 28, 2015 for U.S. Appl. No. 13/107,973, 9 pages.
Response filed Aug. 13, 2015 to Office Action mailed Jan. 28, 2015 from Chinese Patent Application No. 201210537282.X, 9 pages.
Notice of Allowance mailed Sep. 30, 2015 from U.S. Appl. No. 13/107,973, 9 pages.
Final Office Action mailed Oct. 1, 2015 from U.S. Appl. No. 13/215,244, 20 pages.
Request for Examination and Voluntary Amendment filed Jan. 30, 2015 from Japan Patent Application No. 2013-556669, 8 pages.
U.S. Appl. No. 61/449,072, filed Mar. 3, 2011, entitled, "Library-Operating-System Packaging-Model Scenarios", First Named Inventor: Galen C. Hunt, 35 pages.
Notice of Allowance mailed Oct. 9, 2015 from U.S. Appl. No. 13/323,562, 8 pages.
Notice of Allowance mailed Oct. 29, 2015 from U.S. Appl. No. 13/323,562, 5 pages.
Supplementary European Search Report mailed May 7, 2015 from European Patent Application No. 12858489.3, 3 pages.
Preliminary Amendment filed Feb. 13, 2012 from U.S. Appl. No. 13/323,465, 3 pages.
Response filed Oct. 6, 2015 to Final Office Action mailed Jul. 22, 2015 from U.S. Appl. No. 13/323,465, 21 pages.
Non-Final Office Action mailed Dec. 19, 2014 from U.S. Appl. No. 13/372,390, 24 pages.
Response filed Oct. 21, 2015 to Final Office Action mailed Jul. 22, 2015 from U.S. Appl. No. 13/372,390, 18 pages.
Response filed Apr. 20, 2015 to First Office Action mailed Dec. 3, 2014 from China Patent Application No. 201210533610.9, 9 pages.
Response filed Oct. 21, 2015 to Second Office Action mailed Aug. 21, 2015 from China Patent Application No. 201210533610.9, 9 pages.
Office Action mailed Oct. 21, 2014 for European Patent Application No. 12858587.4, 7 pages.
Notice of Allowance mailed Jul. 31, 2014 from U.S. Appl. No. 12/972,081, 10 pages.
Examiner Initiated Interview Summary mailed Sep. 26, 2013 from U.S. Appl. No. 13/196,235, 1 page.
Applicant Initiated Interview summary mailed Sep. 24, 2014 from U.S. Appl. No. 13/196,235, 3 pages.
Response filed Oct. 3, 2014 to Non-Final Office Action mailed Jul. 3, 2014 from U.S. Appl. No. 13/196,235, 28 pages.
Final Office Action mailed Nov. 21, 2014 for U.S. Appl. No. 13/196,235, 31 pages.
Response filed Mar. 2, 2015 to Final Office Action mailed Nov. 21, 2014 from U.S. Appl. No. 13/196,235, 22 pages.
Non-Final Office Action mailed Mar. 17, 2015 for U.S. Appl. No. 13/196,235, 33 pages.
Response filed Jun. 17, 2015 to Non-Final Office Action mailed Mar. 17, 2015 from U.S. Appl. No. 13/196,235, 24 pages.
Final Office Action mailed Sep. 22, 2015 from U.S Appl. No. 13/196,235, 36 pages.
Response filed Nov. 13, 2015 to Non-Final Office Action mailed Jun. 25, 2015 from U.S. Appl. No. 13/314,512, 8 pages.
Final Office Action mailed Dec. 14, 2015 from U.S. Appl. No. 13/314,512, 14 pages.
Office Action and Search Report mailed Nov. 13, 2015 from Taiwan Patent Application No. 101112828, 7 pages.
Notice of Allowance mailed Nov. 24, 2015 from U.S. Appl. No. 13/107,973, 9 pages.
Voluntary Amendment filed Nov. 9, 2015 from Japan Patent Application No. 2014-547269, 7 pages.
Decision on Appeal mailed Dec. 24, 2015 from U.S. Appl. No. 12/463,892, 7 pages.
Second Office Action mailed Nov. 30, 2015 from China Patent Application No. 201210537282.X, 7 pages.
Notice of Allowance mailed Jan. 22, 2016 from U.S. Appl. No. 13/107,973, 28 pages.
Preliminary Amendment filed Nov. 23, 2015 from U.S. Appl. No. 14/850,557, 7 pages.
Notice on the First Office Action mailed Jan. 26, 2016 from China Patent Application No. 2012800115517, 12 pages.
Non-Final Office Action mailed Feb. 1, 2016 from U.S. Appl. No. 13/331,078, 9 pages.
Mergen et al., "Virtualization for High-Performance Computing", ACM SIGOPS Operating Systems Review, vol. 10, Issue 2, Apr. 2006, pp. 8-11, 4 pages.
Sapuntzakis et al., "Optimizing the Migration of Virtual Computers", Proceedings of the 5th Symposium on Operating Systems Design and Implementation (OSDI), Usenix Association, Boston, MA, Dec. 9-11, 2002, pp. 377-390, 15 pages.
Lorch, Jacob R. and Smith, Alan Jay, "The VTrace Tool: Building a System Tracer for Windows NT and Windows 2000", MSDN Magazine, vol. 15, No. 10, 2000, pp. 86-90, 93-94, 96-98, 101-102, 12 pages.
"Safenet Hardware Security Modules (HSMs)", retrieved on Oct. 31, 2013, at <<safenet-inc.com/products/data-protection/hardware-security-modules-hsms/>>, 9 pages.
"Thoughts on Intel's Upcoming Software Guard Extensions(Part 2)", published on Sep. 23, 2013, retrieved at <<sec.soup.io/post.348921006/Thoughts-on-Intels-upcoming-Software-Guard-Extensions, 10 pages.
"What is Apple's New Secure Enclave and Why is it Important?", published on Sep. 18, 2013, retrieved at <<forbes.com/sites/quora/2013/09/18/what-is-apples-new-secure-enclave-and-why-is-it-important/2/>>, 5 pages.
AWS CloudHSM, retrieved on Oct. 28, 2013, at <<aws.amazon.com/cloudhsm/>>, 5 pages.
Chiueh et al., "Integrating Segmentation and Paging Protection for Safe, Efficient and Transparent Software Extensions", Proceedings of 17th ACM Symposium on Operating Systems Principles (SOPS '99), published as Operating Systems Review, vol. 34, No. 5, Dec. 1999, pp. 140-153, 14 pages.

(56) References Cited

OTHER PUBLICATIONS

Sun Bytecode Verifier Vulnerability, Sun Security Bulletin #00218, The U.S. Department of Energy Computer Incident Advisory Center Information Bulletin No. M-060, Mar. 19, 2002, 5 pages.

Cox et al., "A Safety-Oriented Platform for Web Applications", Proceedings of Symposium on Security and Privacy, 2006 pp. 350-364, 15 pages.

Douceur et al., "Leveraging Legacy Code to Deploy Desktop Applications on the Web", retrieved on Oct. 16, 2015 at <<http://usenix.org/legacy/event/osdi08/tech/full_papers/douceur/douceur_html/index.html>>, 23 pages.

Erlingsson et al., "XFI: Software Guards for System Address Spaces", Proceedings of the 7th USENIX Symposium on Operating Systems Design and Implementation (OSDI '06), pp. 75-88, 14 pages.

Ford & Cox, "Vx32: Lightweight, User-level Sandboxing on the x86", Proceedings of the USENIX Annual Technical conference, 2008, pp. 293-306, 14 pages.

Ford, Bryan, "VXA: A Virtual Architecture for Durable Compressed Archives", Proceedings of 4th USENIX Conference on File and Storage Technologies (FAST'05), 2005, vol. 4, pp. 295-308, 14 pages.

Frank et al., "Fuss, Futexes and Furwocks: Fast Userlevel Locking in Linux", Proceedings of the Ottawa Linux Symposium, Jun. 26-29, 2002, Ottawa, Ontario, Canada, pp. 479-495, 19 pages.

Karmel, Anil, "Building YOURcloud: The Federal Government's first Secure Hybrid Community Cloud", retrieved on October 30, 2013, at <<govmarkcouncil.com/presentations/event112912/Anil_Karmel.pdf>>, RightPath, 39 pages.

Karthik & Krishna, "A Secure Access Code Technique for Remote Data Integrity on Public Cloud", International Journal of Computer Applications, vol. 77, No. 14, Sep. 2013, pp. 26-31, 6 pages.

Keetch, T., "Escaping from Protected Mode Internet Explorer," Verizon Business, retrieved at <<google.com/webhp?sourceid=chrome-instant&ion=1&espv=2&ie=UTF-8#q=keetch+escaping+from+protected+mode+internet+explorer>>, 47 pages.

Levasseur et al., "Pre-Virtualization: Slashing the Cost of Virtualization," Technical Report 2005—Nov. 30, 2005, 14 pages.

Verizon Wireless, "Escaping from Microsoft's Protected Mode Internet Explorer—Evaluating a Potential Security Boundary", White Paper, 2010, 8 pages.

Masti et al., "An Architecture for Concurrent Execution of Secure Environments in Clouds", Proceedings of the ACM aloud Computing Security Workshop, CCSW'13, Nov. 8, 2013, Berlin, Germany, 12 pages.

McKeen et al., "Innovative Instructions and Software Model for Isolated Execution", Proceedings of the 2nd International Workshop on Hardware and Architectural Support for Security and Privacy, Jun. 24, 2013, 8 pages.

Morrisett et al., "From System F to Typed Assembly Language", Symposium on Principles of Programming Languages (POPL), 1998, pp. 85-97, 13 pages.

Price & Tucker, "Solaris Zones: Operating System Support for Consolidating Commercial Workloads," Proceedings of the Large Installation Systems Administration Conference (LISA), Sun Microsystems, Nov. 14-19, 2004, vol. 4, pp. 243-256, 14 pages.

Provos, Niels, "Improving Host Security with System Call Policies", Proceedings of the 12th Conference on USENIX Security Symposium, (SSYM), 2003, 15 pages.

Rinard et al., "Enhancing Server Availability and Security Through Failure-Oblivious Computing", Proceedings of Operating Systems Design and Implementation (OSDI), 2004, pp. 303-316, 14 pages.

Sedayao, Jeff, "Enhancing Cloud Security Using Data Anonymization," White Paper of Intel, Jun. 2012, 8 pages.

Swift et al., "Improving the Reliability of Commodity Operating Systems", Proceedings of Symposium on Operating Systems Principles (SOSP), Oct. 19-22, 2003, pp. 207-222, 16 pages.

Applicant-Initiated Interview Summary mailed Feb. 10, 2016 from U.S. Appl. No. 12/463,892, 3 pages.

Response filed Feb. 23, 2016 to Final Office Action mailed Jun. 14, 2012 and PTAB Decision of Jan. 8, 2016 from U.S. Appl. No. 12/463,892, 16 pages.

Response filed Feb. 5, 2016 to Final Office Action mailed Sep. 22, 2015 from U.S. Appl. No. 13/196,235, 30 pages.

Pre-Brief Conference Request and Notice of Appeal filed Feb. 22, 2016 from U.S. Appl. No. 13/196,235, 8 pages.

Advisory Action mailed Feb. 22, 2016 from U.S. Appl. No. 13/196,235, 3 pages.

Response filed Jan. 15, 2016 to Final Office Action mailed Oct. 1, 2015 from U.S. Appl. No. 13/215,244, 16 pages.

Advisory Action mailed Feb. 24, 2016 from U.S. Appl. No. 13/215,244, 8 pages.

Response filed Feb. 18, 2016 from Taiwan Patent Application No. 101112828, 31 pages.

Notice of Allowance mailed Mar. 11, 2016 from U.S. Appl. No. 13/323,562, 13 pages.

Response filed Feb. 4, 2016 from China Patent Application No. 201210537282.X, 7 pages.

\* cited by examiner

ULTRA-LOW COST SANDBOXING FOR APPLICATION APPLIANCES

BACKGROUND

Sandboxing is a security technique for isolating the execution of untested code and untrusted applications. The best prior sandboxing solutions used virtual machines to isolate one application from the rest of the applications on a system. With the application isolated in a virtual machine, the isolated application cannot compromise the state of the system or other applications. The isolated application can also be migrated from one computer to another computer by carrying the entire virtual machine container (both memory and storage). Finally, vendors can create application appliances by bundling an application and the required operating system components into a virtual machine that is distributed to customers.

Users seldom use isolated virtual machines for security in practice because the machines are too expensive in terms of computer resources because the virtual machines emulate low-level hardware interfaces, thus forcing the isolation container to contain a complete operating system. Furthermore, in common use, only the largest applications (such as server applications) are distributed in virtual machines, again, because the storage resource overheads of including a complete separate copy of the operating system are too high to justify for all but the largest applications.

Additionally, memory overhead for virtual machines is high because each virtual machine runs a complete (or nearly complete) operating system to abstract virtual hardware (within the virtual machine) to provide the type of environment expect by an application. For example, a standard application expects to run on the abstraction of virtual memory. However, a virtual machine typically provides an abstraction of physical memory with page tables, the mechanisms used by an operating system to create virtual memory. Likewise, an application expects to access a file system, whereas a virtual machine only provides the abstraction of disk blocks. Finally, where an application expects the abstraction of threads of execution, a virtual machine provides instead the hardware abstractions of processors, timers, and interrupts, out of which an operating system creates the abstraction of threads.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the sandboxing of applications by taking core operating system components that normally run outside the application process, and on which the application process depends on to run, and converting these core operating components to run within the application process. To reduce overheads, the architecture takes basic computing services already provided by the host operating system, such as virtual memory and threads, and safely isolates these abstractions for use by the sandbox environment.

More specifically, new operating system APIs (application program interfaces) are created that include only basic computation services, thus, separating the basic computation services from rich application APIs. The code providing the rich application APIs is moved out of the operating system and into the application isolation environment—the application process (or can be run external to the application process).

For example, in a Windows™ implementation, the entire Win32 subsystem and the relevant portions of the system registry are copied into the application sandbox so that the sandboxed application runs its own copy of the Win32 subsystem. Since the Win32 subsystem now provides services to only a single application, the Win32 subsystem need not be protected with security checks or other mechanisms, such as placing the Win32 subsystem in its own operating system process, from the application. Rather, the Win32 subsystem can be run in the same process as the application, further reducing the overheads of providing an isolated environment.

To accomplish this, a remote user I/O server is included in the application process as well. The operating system components, which would normally rely on device drivers to communicate to hardware such as display, keyboard, and mouse, instead use a remote user I/O server, to communicate with remote user I/O devices thereby creating an application appliance. By including all of the external operating system components with the application the standard system call interface can be disabled at the bottom of a process with an ultra-small operating system interface that provides only local compute capability.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
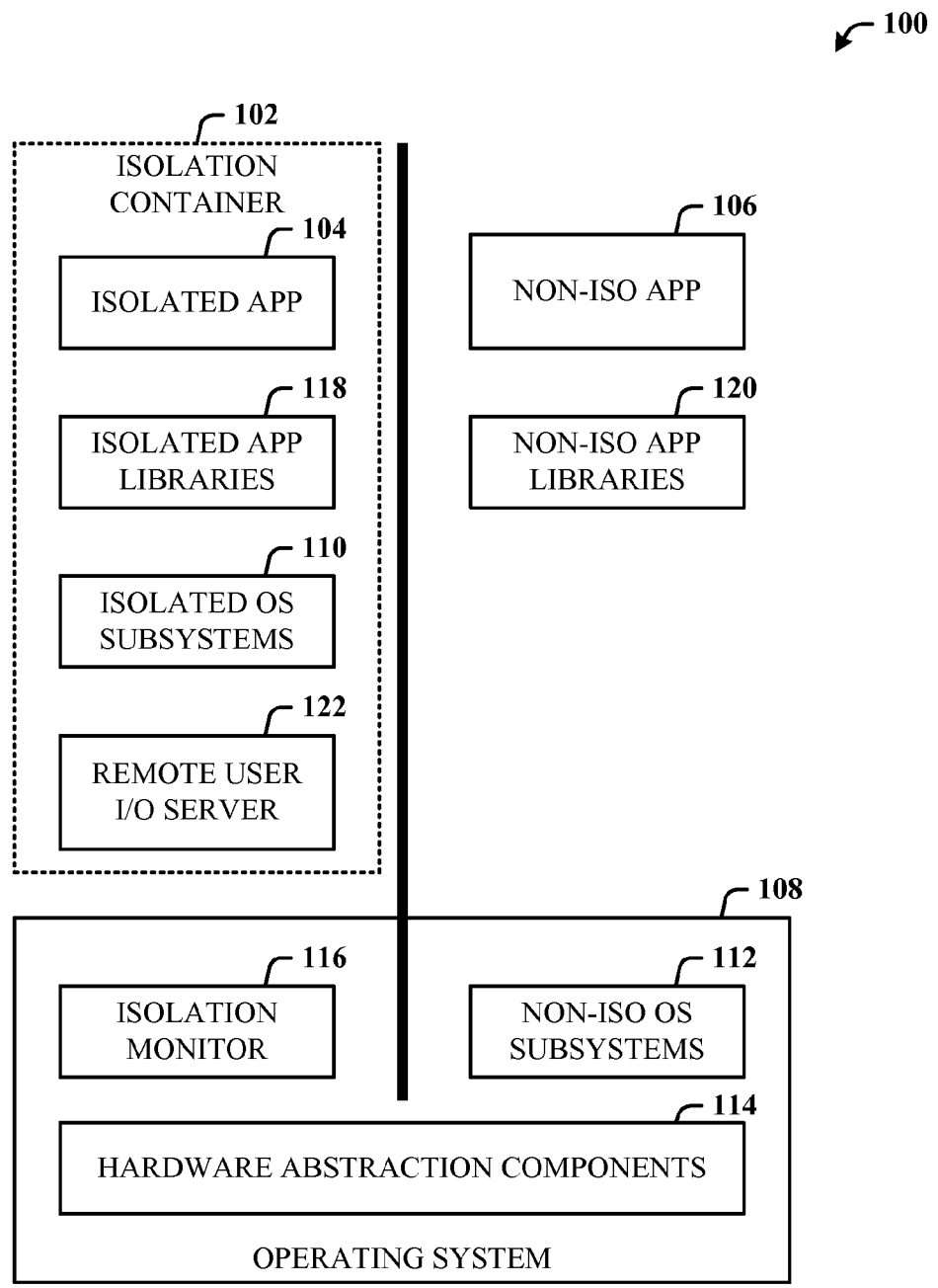
FIG. 1 illustrates a secure application execution system in accordance with the disclosed architecture.

Operating systems (OSs) mix basic primitives of computation, such as threads, virtual memory, and file access, with rich APIs (application program interfaces) such as application configuration management, GUI (graphical user interface) services (e.g., the display of windows and direction of keyboard and mouse input to specific windows), and user interfaces components. It is the rich APIs that are desired to be isolated to provide a sandboxed application environment. The disclosed architecture takes the abstractions provided by the host operating system and converts (refactors) these abstractions for use in and by the sandbox environment. Basic APIs are refactored to expose only isolated computation abstractions to code in the sandbox environment. Rich APIs are refactored to run as user-space libraries isolated within the sandbox environment.

As applied to Microsoft Windows™ OSs, the disclosed architecture refactors a Windows OS and moves much of the functionality required by real applications out of the OS kernel and into user-space libraries. This includes, for example, the complete set of Windows GUI services and the registry—complex components with wide interfaces that traditional Windows implements as shared kernel services. This dramatically reduces the size of the architecture's system-call interface. Behind this narrow interface is a simple and robust TCB (trusted computing base) implementation.

Running applications according to the architecture provides at least the following benefits: isolation—by moving most of OS functionality out of the TCB, processes are much more robustly isolated than in the OS; migration—removing process' reliance on shared kernel state also allows process images to be easily moved from machine to machine; and, future proofing—each application can incorporate whatever version of the OS libraries it was written against. As the OS evolves, newer applications can be written against new features and use newer libraries on the same machine. This also supports legacy applications.

This isolation of program state enables the user to start a program and then move the program's running memory image from one device to another, such as from a desktop computer to a laptop computer, from a laptop computer to a mobile phone, from a mobile phone to a server in the cloud, etc. The significant reduction in resources and overhead provided by the disclosed architecture now makes it possible to sandbox every application.

When applied specifically to a Windows™ operating system environment, the rich operating system components on which the sandboxed application depends are converted to run within the application process. For the Windows implementation, a remote user I/O service is implemented using the remote desktop protocol (RDP) running within the application process as well. The operating system components, which normally rely on device drivers to communicate to hardware such as display, keyboard, and mouse, instead use the RDP server code, thus creating an application appliance. By including all of the external operating system components with the application the standard system call interface can be disabled at the bottom of a process with an ultra-small OS interface that provides only isolated basic compute capability.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a secure application execution system 100 in accordance with the disclosed architecture. The system 100 includes an isolation container 102 in which an isolated application 104 (denoted Isolated App) runs in isolation from a non-isolated application 106 (denoted NON-ISO App). The isolated application 104 and non-isolated application 106 both run in association with a single operating system (OS) 108. Isolated OS subsystems 110 (denoted Isolated OS subsystems) of the isolation container 102 provide services to the isolated application 104, and non-isolated OS subsystems 112 (denoted NON-ISO OS subsystems) of the OS 108 provide services to the non-isolated application 106. The isolated OS subsystems 110 and non-isolated OS subsystems 112 provide equivalent services to the corresponding isolated application 104 and non-isolated application 106.

The OS 108 includes hardware abstractions 114 available for both the isolated and non-isolated applications (104 and 106). Additionally, the OS 108 includes an isolation monitor 116 that provides the interface for services from the OS 108 to the isolation container 102. The separation of state related to the isolated application 104 from the state related to the non-isolated application 106 is represented by the black bar that extends between the isolated application 104 and the non-isolated application 106, and down into the OS 108 between the isolation monitor 116 and the non-isolated OS subsystem 112. The system 100 can also include in the isolation container 102 isolated application libraries 118 (denoted Isolated APP Libraries) for the isolated application 104, and non-isolated application libraries 120 (denoted NON-ISO APP Libraries) for the non-isolated application 106. The libraries (118 and 120) expose the services of the OS subsystems (110 and 112) to the respective applications (102 and 104).

The isolation container 102 may also contain a remote user I/O server 122 which increases the similarity between the isolated OS subsystems 110 and the non-isolated OS subsystems 112 by providing emulations of certain hardware components, such as video displays, keyboards, and mice.

Note that as illustrated, the isolated OS subsystem 110 and remote user I/O server 122 are external to the isolated application 104; however, it is to be understood that, alternatively, the isolated OS subsystem 110 and remote user I/O server 122 can be part of the isolated application 104.

Note that as illustrated, the isolation monitor 116 is a distinct, separate component from the other portions of the OS 108; however, it is to be understood that, alternatively, the isolation monitor 116 functionality can be implemented by modifying the other portions of the OS 108 to enable running of the isolating functions of the isolation monitor 116 for the isolated application 104 in addition to running non-isolated functions for the non-isolated application 106.

The equivalent services may include application configuration management services, GUI services, printer services, and/or audio services, for example. The equivalent services are exposed to the isolated application 104 and non-isolated application 106 accessed either directly or through user-space libraries (118 and 120). The libraries (118 and 120) are compatible with different versioned isolated and non-isolated applications (104 and 106). The operating system 108 further includes hardware abstraction components 114 available for both the isolated and non-isolated applications (104 and 106). The operating system 108 includes the isolation monitor 116 which employs a collection of rules that map the approval or denial of requests to access resources to an application manifest.

The isolated application 104 and the non-isolated application 106 use basic computation services provided by the OS. The basic computation services include one or more of virtual memory management, thread creation, and thread synchronization.

The manifest defines which resources are optionally available and which resources are available and required for correct execution of the application. The code within the isolation container 102—including the isolated application 104, the isolated application libraries 118, the isolated OS subsystems 110, and the remote user I/O server 122—interfaces to the kernel of the operating system 108 through the isolation monitor 116. The contents of the isolation container 102 may be migrated to a different computing environment by reproducing the address space on the different computing environment and then recreating the threads and other resource handles on the different computing environment using descriptions of those threads and resource handles saved in the address space of the isolation container 102. In other words, the isolated application can be migrated to a second computing environment by copying the address space of the isolation container or by reading the address space of the isolation container, which isolation container is in a first computing environment.

Figure 2:
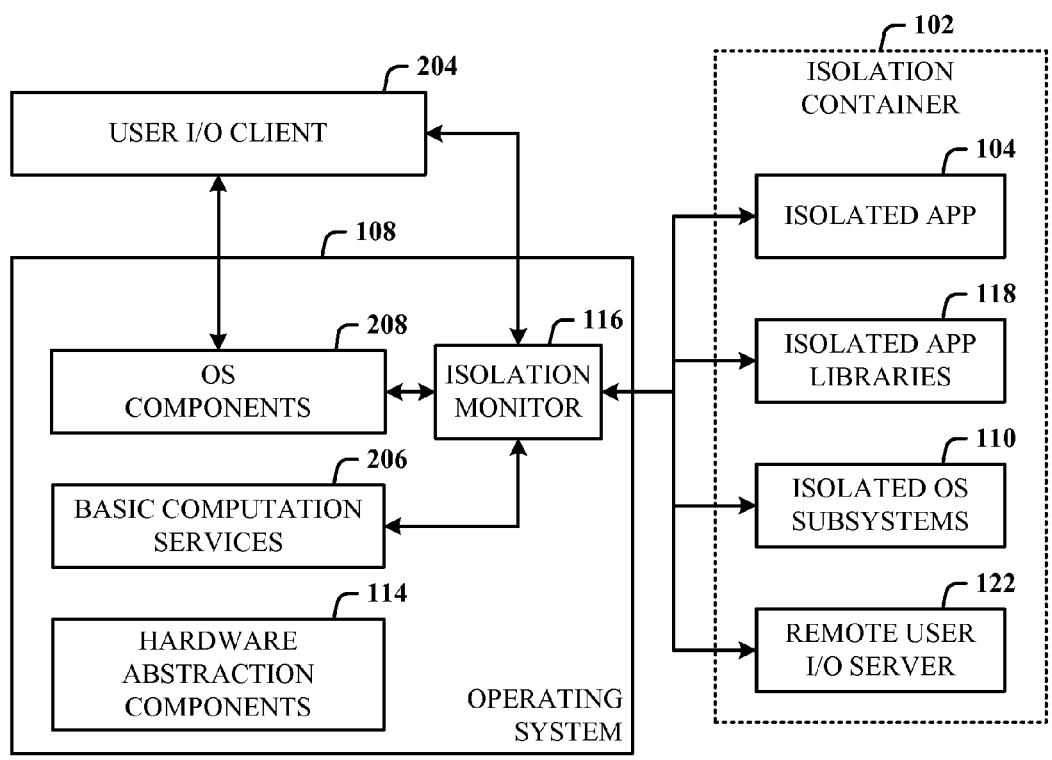
FIG. 2 illustrates a secure application execution system that utilizes an isolation monitor for communications between the isolated application and the operating system.

FIG. 2 illustrates in more detail the flow of communication through the isolation monitor 116 between the isolation container 102 (also called a sandbox environment) and the operating system 108 and external services such as the display and user I/O client 204. The isolated application 104, the isolated application libraries 118, the isolated OS subsystems 110, and the remote user I/O server 122 can all request services through the isolation monitor 116. Services are presented in at least two forms. Services on private virtual memory, threads, private files, and messages to remote services are presented as system calls by the isolation monitor 116 and executed through basic computation services 206 within the kernel. Other services, such as secured access to the video display and other user I/O devices including keyboard and mouse, are executed in a display and user I/O client 204 accessed using network protocols transported through communication pipes connected by the isolation monitor 116. This is described in greater detail infra.

The isolation monitor 116 defines new OS APIs that include just the basic computation services, thus separating the basic primitives from rich application APIs. Then, the code that provides the rich application APIs is copied out of the operating system, from the non-isolated OS subsystems 112 (of FIG. 1), and into the application process (or sandbox environment) to the isolated OS subsystems 110. For example, in a Windows implementation, the entire Win32 subsystem (e.g., Win32, COM, shell, printing, etc.) is copied into the application sandbox so that each application runs its own copy of the Win32 subsystem. In a Linux (or Apple™ operating system) implementation, for example, the subsystem can include X-Windows, display postscript, printing (e.g., common Unix printing system) and audio (e.g., advanced Linux sound architecture). (Although described in great detail with respect to Windows, as indicated above the disclosed architecture applies to other operating systems implementations as well.)

Since the Win32 subsystem now provides services to only a single application, the subsystem need not be protected with security checks or other mechanisms, such as placing it in another operating system process, from the application. Instead, the Win32 subsystem can be run in the same process as the application. The minimal computation interface required for the sandboxed environment is shown below.

The technique uses a remote user I/O server (e.g., server 122) within the application appliance to provide a device driver interface to the Win32 subsystem, but then communicates (through a local communication channel) to the user interface services on the host OS via the display and user I/O client 204. Application compatibility is preserved by reproducing the functionality that Windows provides in the operating system 108 (primarily from the non-isolated OS subsystems 112) as components in the user-mode (as the isolated OS subsystems 110), in the isolated process.

Continuing with the context of a Windows operating system, these components (the isolated application libraries 118 which provide OS API components of FIG. 1 and FIG. 2) can include, but are not limited to, the Win OS API module (e.g., which includes kernel32.dll, user32.dll, gdi32.dll), the "New Technology" NT API module (e.g., ntdll.dll, RDP display interface (e.g., rdpvdd.dll), and an interface to the isolation monitor 116 for services and other processes outside the isolated environment. Note that the equivalent services mentioned above are a subset of the services that can be employed in the OS subsystem.

The disclosed architecture utilizes an isolation-optimized interface by providing at least virtual memory management, file access, thread creation, pipes, system time, and cryptographically strong random bits. These basic computation services are a sufficient kernel substrate upon which to implement higher-level process services as libraries, such as a registry for configuration management, thread worker factories, and more sophisticated thread synchronization operations. Isolation is enforced by a combination of virtual memory hardware and a highly restricted kernel API exposed by the isolation monitor 116. Communication is allowed only through pipes. Pipes may not be configured at runtime; instead, the pipes are declared in the application manifest that specifies the requisite files and pipes to other applications or system services (such as the desktop display).

The architecture application binary interface (ABI) exports the following abstractions (and each minimizes the OS state stored on behalf of the application, facilitating user-space process migration and future proofing).

File handles. Memory-mapped files are provided by which applications map in read-only text and data sections. Processes do not communicate through the file system. Following the principle of minimal OS state, the file handles have no cursor; sequential read( ) operations are managed by emulation in an isolation application library instead. Conceptually, file mapping can be implemented with a single map system call. Since Windows programs first open a file and then map it, file handles are provided to connect open to map without breaking error handling code in applications.

Pipes. Inter-process communication (IPC) and blocking synchronization are accomplished with ordered, reliable, message-based pipes, equivalent to PF UNIX-domain SOCK DGRAM pipes. When multiple threads attempt to read the same pipe concurrently, each message is delivered to a single reader. A DkPipeSelect( ) call is provided that returns when data is available. This is similar to the Posix (portable OS interface for Unix) convention, in which select and poll return when data is available. Standard Windows pipes have the convention that WaitForMultipleObjects( ) returns after data has been read, possibly on multiple channels. The return-on-read semantics makes simulating many NT™ (new technology) kernel functions needlessly complicated; therefore, return-on-available semantics are provided. Applications specify pipes to other applications or to the user interface, in the application manifest.

Threads and processes. ABIs are provided for thread creation and process creation. Creating a process is more than just creating a thread in a new address space; the kernel also evaluates a new manifest and creates new pipe and file relationships. As part of process creation, the parent may request a pipe to the child. To maintain isolation, a process or thread may only terminate itself; there is no ABI to terminate, change the memory mapping of, or otherwise change the state of a separate process or thread.

GUI access. A feature for enabling a narrow isolation boundary is the use of a minimal pixel-blitting interface. Conventional GUI (graphical user interface) APIs such as in Windows and X11 expose a variety of abstractions, for example, windows, widgets, fonts, menus, events, callbacks, and much more. In contrast, the disclosed architecture moves all of the rendering and event loop functionality into the application itself, exposing only simple pixel-blit access to the trusted display, and a one-way flow of low-level keyboard and mouse input messages.

RDP background. The remote user I/O server 122 and the display and user I/O client 204 exchange messages using the remote desktop protocol (RDP), a protocol designed to achieve bandwidth-efficient remote display access. Its application-side component is a video driver and frame buffer that absorbs the output of the rich GUI framework above it. RDP harvests pixmaps (pixel maps) off the frame buffer and transmits the pixmaps to the display component. Mouse click and keystroke events from the display component are sent to the application component and injected into the GUI framework as if from local devices. RDP encapsulates the complexity of the GUI framework on one side of the channel, exposing only a conceptually simple pixel-blitting interface.

RDP exploits this interface simplicity to insert a variety of compression and coding techniques, and even profile-driven adaptive meta-protocols. This is a simple display-side code base, and a simple protocol amenable to sanitization. Essentially, RDP minus compression is a simple blit interface; the work of converting the GUI API to pixels on the application side and the work of blitting pixels on the display side has been done.

The previous application-side implementation of RDP is a kernel-mode display driver: it provides a frame buffer target for the output of the lowest layers of the Windows GUI stack, identifies changed pixels, and ships buckets of pixels to the display side. The architecture, in repackaging the kernel-side layers of the Windows GUI stack as in-process application libraries, also links in the application-side components of RDP in the remote user I/O server 122.

The display-side component, the user I/O client 204, retains the task of asking the hardware abstracting components 114, such as the display, to render the pixels received from the application-side implementation of RDP in the remote user I/O server 122. The architecture uses the existing Windows-based RDP client implementation, stripped down to remove unneeded compression modules to maximize robustness.

A benefit of the blit-based approach, realized by the RDP protocol, is that it is stateless, isolated, and gracefully handles disconnection. This property is utilized to transparently decouple application logic from the user interface, which simplifies the task of process migration. Rather than serializing and migrating complex kernel data structures, these data structures travel in-place in the application's memory image, where the structures were created by the isolated OS subsystems 110.

With respect to refactoring Windows, the architecture moves code out of the kernel or re-implements services in user-level libraries. The kernel portion of the Windows subsystem (win32k) is ported from kernel modules to a user-level dynamically-linked library. A portion of the NT kernel API is also re-implemented in a user library on top of the application subsystem kernel API.

Following is background about the Windows OS. In a Windows system, an application and its libraries occupy a process along with system-supplied user-mode libraries that provide interfaces to the core system services (ntdll, similar to the Unix libc) and to the graphical user interface (user 32 and gdi32, the equivalent of Unix libX11 and higher-level libraries such as libgtk). The NT kernel implements the core of a monolithic operating system: resource management, scheduling, device drivers, file system, and the registry, a key-value store for configuration data. The Windows subsystem (win32k) provides the analogue of an X server, a print server (e.g., the Common Unix Printing System), and audio support (e.g., Advanced Linux Sound Architecture).

There are two system daemons in Windows: csrss and wininit. Csrss (the Client/ServerRuntime SubSystem) is the first user mode process started during boot, the analogue of the Unix init daemon. Csrss' system initialization duties also include preloading kernel caches with public data to be shared among all processes, such as the default fonts, internationalization tables, and cursors. The wininit daemon launches the components of the user's desktop upon login, the analogue of gnome-session. Each new process contacts csrss, which establishes a shared-memory segment between the shared process and win32k used to save kernel-crossings for read-only GUI operations.

The disclosed architecture preserves application compatibility by reproducing the functionality Windows provides in the kernel as components of the user-mode, isolated process. The kernel GUI components, including both the general win32k library and the video driver implemented by the RDP server, are moved directly into the subsystem process (the former is part of the isolated OS subsystems 110 and the latter is the remote user I/O server 122). The ntdll interface library is preserved, but rather than calling into the kernel, it now calls an NT.shim library, an implementation that simulates the kernel features expected by most applications (part of the isolated OS subsystems 110).

The isolated process user interface is exposed to the real world via an RDP display client (the user I/O client 204) which accesses the Windows kernel through conventional APIs. In other words, the user I/O client 204 is a non-isolated application 106, which uses the non-isolated OS subsystems 112.

With respect to isolation, a well-isolated process is a useful mechanism. This is exploited by introducing policies in the form of the application firewall. Users specify simple, coarse rules that either protect sensitive data and applications ("allow only these two applications to touch this financial data") or rules that confine untrusted applications ("disallow this downloaded game from touching any of my data"). A collection of such rules forms an application firewall. The rules map to approving or denying application manifest requests.

Applications specify requirements for external resources and communication pipes with the application manifest. The application manifest specifies which resources are required and which are optional; if an optional pipe is not available, the application loses non-critical functionality. An application's manifest requests a set of IPC pipes. For each pipe, the manifest gives the external name of the pipe, an internal identifier, and a flag indicating which pipes can tolerate disconnection for migration.

Since all inter-process communication goes through declared pipes, an application firewall can impose information flow rules, ruling out particular pipes, or specifying ALLOW or DENY lists of applications that may connect to a given pipe endpoint. The application firewall can be configured by the user during application installation.

In one implementation, each application (e.g., isolated application 104) is distributed with all of its requisite files, including supporting libraries, fonts, and internationalization tables. In an alternative implementation, an application's manifest may also specify access to "My Music" or "My Documents", which the user's firewall may approve or deny.

Figure 3:
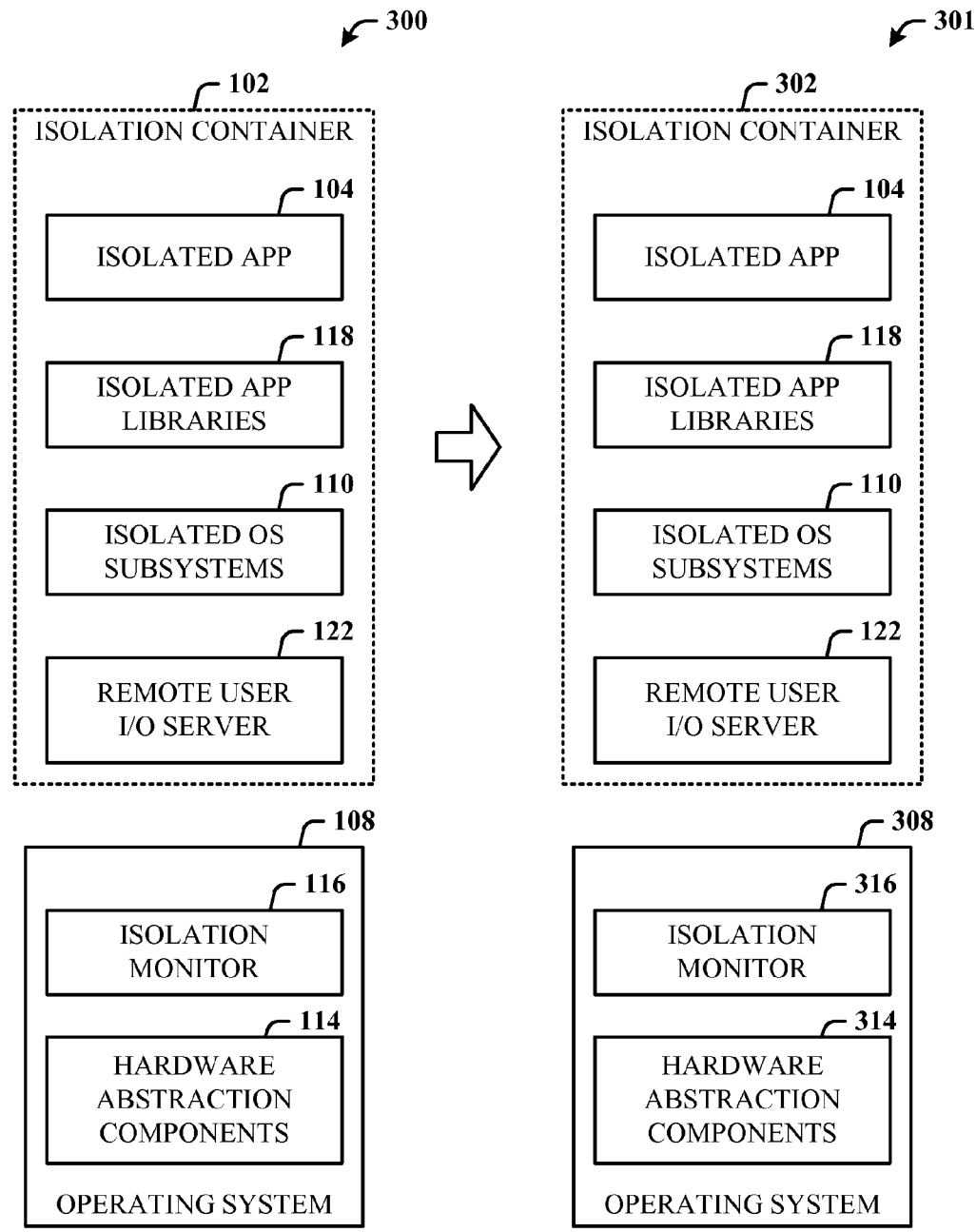
FIG. 3 illustrates future proofing in which an isolated application runs on either a first operating system or a second operating system.

FIG. 3 illustrates future proofing in which the isolated application 104 which runs in a first secure application execution system 300 can also be run in a second secure application execution system 301. As previously described in FIG. 1, the first secure application execution system 300 includes the first operation system 108 with the isolation monitor 116 (denoted here as a first application monitor). The second secure application execution system 301 includes a second operating system 308 with a second isolation monitor 316. The basic computation services exposed by the second isolation monitor 316 are compatible with the basic computation services exposed by the first isolation monitor 116.

When run on the second operating system 308, the isolated application 104 is placed in a different isolation container 302 as is compatible and provided by the second OS 308, and isolated application 104 uses the exact same application code and the same code for the same isolated application libraries 118, isolated OS subsystems 110, and remote user I/O server 122. Providing compatibility between the first operating system 108 and the second operating system 308 is straightforward with the disclosed architecture, because the rich APIs that are often large in number and have complex semantics which are captured in the isolated OS subsystems 110. The isolated application 104 runs with the same rich APIs in the isolated OS subsystems 110 whether it runs on the first operating system 108 or the second operating system 308.

Note that the isolation containers (102 and 302) can both be run on the same computer or each on a different computer. Note also that the operating systems (108 and 308) can be the same type (e.g., Win XP) of operating system each run on a different computer, the same single operating system (OS 108 is the same operating system as OS 308) running on a single computer, different type of operating systems (e.g., Win XP versus Win 7) running on the same computer (e.g., via virtual machines, multi-boot configuration, etc.), and so on.

For example, using the described architecture, a newer Windows operating system (e.g., Windows 7™) can be made to run applications written for the Windows XP operating systems when those applications are combined in an isolation container with Windows XP isolated OS subsystems, and the Windows 7 operating system runs an isolation monitor that exposes a set of basic computation services compatible with the isolation monitor targeted by the Windows XP isolated OS systems.

Conversely, using the described architecture, the Windows XP operating system can run applications written for the Windows 7 operating system when those applications are combined in an isolation container with Windows 7 isolated OS subsystems and the Windows XP operating system runs an isolation monitor that exposes a set of basic computation services compatible with the isolation monitor targeted by the Windows 7 isolated OS subsystems.

In yet another implementation, an application (e.g., isolated application 104) that normally runs on a Vendor A operating system (OS 108) can be made to run on a Vendor B operating system (OS 308), which is different than the Vendor A operating system) by configuring an isolation monitor (the isolation monitor 316) of the Vendor B operating system to interface to the Vendor B operating system, and also interface to the isolated OS subsystem (isolated subsystem 110) that facilitates running of the application on the Vendor B operating system.

In a more specific example of the above generalization using Windows and Apple programs (but also applies to any mix of programs and operating systems), the isolated application 104 of the secure application execution system 300 (e.g., Windows application running on a Window operating system) is now desired to be run in the second secure application execution system 301 of an Apple operating system (a Windows application on an Apple operating system).

To make this work, the second isolation monitor 316 is designed to interface to the Apple OS (the second OS 308) and expose a set of basic computation services compatible with the Windows-based isolated OS subsystem 110 (as used in the first isolation container 102, but now also used in the second isolation container 302). Those skilled in the art will recognize that creating a compatible isolation monitor is relatively straightforward because of the small number and simple semantics of the basic computation services (e.g., in one implementation, the isolation monitor is fewer than 5,000 lines of C++ code). This is in contrast with the large number and complex semantics of the rich APIs in the isolated OS subsystems (e.g., one implementation of the Windows Win32 subsystem is over one million lines of C and C++ code).

Put another way, a secure application execution system is provided that comprises an isolation container in which an application for a first OS runs in isolation, the isolation container formed in association with a second OS, an isolated OS subsystem that runs in the isolation container in association with and interfaces to the application to provide rich functionality to the application, and an isolation monitor of the second OS that interfaces basic computation services of the second OS to the isolated OS subsystem to enable the application to run in isolation on the second OS. The basic computation services include at least one of virtual memory management, thread creation, or thread synchronization. The isolated application uses a corresponding remote user I/O server to communicate with a user I/O client outside the isolation container.

The rich functionality provided by the isolated OS subsystem includes at least one of a graphical user interface service, an application configuration management service, a printer service, or an audio service. The isolated application uses a corresponding remote user I/O server to communicate with a user I/O client outside the isolation container. The isolated application is migrated to a second computing environment by reading from some or all of an address space of the isolation container, which is in a first computing environment. The isolation monitor employs a collection of rules that map from an application manifest to approval or denial of resource requests, the manifest defines which resources outside the isolation container are available to the isolated application.

Figure 4:
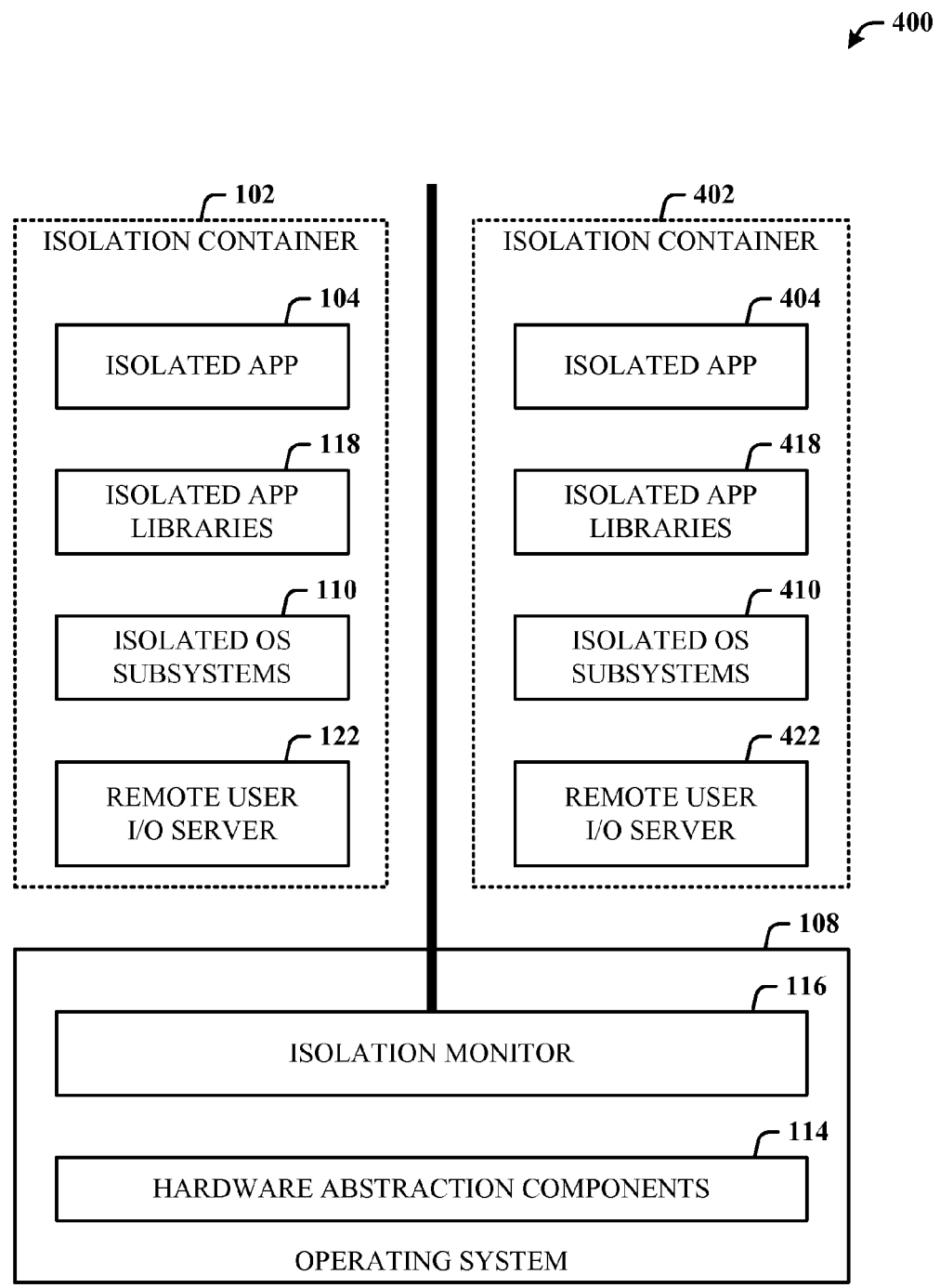
FIG. 4 illustrates future proofing in which a first isolated application written to run on a first operating system and a second isolated application written to run on a second operating system both run on the same operating system.

FIG. 4 illustrates future proofing system 400 in which the operating system 108 and the isolation monitor 116 can run the first isolated application 104 with the first set of isolated OS subsystems 110 and can run a second isolated application 404 with a second set of isolated OS subsystems 410, and both isolated OS subsystems (110 and 410) use basic computation services exposed through the same isolation monitor 116. The set of rich APIs exposed by the first set of isolated OS subsystems 110 differs in number or semantics from the second set of isolated OS subsystems 410. The second isolated application 404 is run in a second isolation container 402 that includes the second isolated application 404, a set of second isolated application libraries 418, the second set of isolated OS subsystems 410, and a second remote user I/O server 422.

If the second set of OS subsystems 410 provides sufficient compatibility with the first set of OS subsystems 110, the second remote user I/O server 422 may be the same as the first remote user I/O server 122. Likewise, the second isolated application libraries 418 may be the same as the first isolated application libraries 118. Still further, the second isolated application 404 may be the same as the first isolated application 104.

For example, a Windows 7 operating system can be made to run applications written for the Windows XP, Windows Vista, or Windows 7 operating systems when those applications are combined in associated isolation containers with Windows XP, Windows Vista™, or Windows 7 isolated OS subsystems, respectively, and the Windows 7 operating runs an isolation monitor compatible with the isolation monitors targeted by the Windows XP isolated OS subsystems, the Windows Vista isolated OS subsystems, or the Windows 7 isolated OS subsystems. Those skilled in the art will recognize that the modifications made to make a first set of isolated OS subsystems, such as the Windows 7 isolated OS subsystems, run on an isolation monitor can be reused to make a second set of isolated OS subsystems, such as the Windows XP isolated OS subsystems, run on the same isolation monitor. This is the case because the basic computation services provided by an isolation monitor are not tailored to a specific isolated OS subsystem, but instead provide simple semantics general to many isolated OS subsystems.

Put another way, a secure application execution system is provided that comprises a first isolation container in which a first isolated application runs in isolation, and a second isolation container in which a second isolated application runs in isolation, the first isolated application and the second isolated application running in association with a single OS. The system further includes a first isolated OS subsystem of the first isolation container that provides services to the first isolated application, a second isolated OS subsystem of the second isolation container that provides services to the second isolated application, and an isolation monitor via which basic computation services are provided to each of the first isolated OS subsystem and the second isolated OS subsystem. The basic computation services include virtual memory management, threads creation, and thread synchronization.

The rich functionality includes at least one of the isolated OS subsystems, the isolated OS subsystems comprise at least one of a graphical user interface service, an application configuration management service, a printer service, or an audio service. At least one of the first isolated application or the second isolated application uses a corresponding remote user I/O server to communicate with a user I/O client outside of a corresponding isolation container. The first isolated application uses a first corresponding remote user I/O server and the second isolated application uses a second corresponding remote user I/O server, and the first corresponding remote user I/O server and the second corresponding remote user I/O server both communicate with a first user I/O client outside the isolation containers.

In yet another implementation, a secure application execution system is provided that comprises an isolated OS subsystem that runs in an isolation container and provides services to an isolated application equivalent to services provided by a non-isolated OS subsystem to an non-isolated application. The isolated OS subsystem receives basic computation services from an isolation monitor in an OS that provides similar basic computation services to the non-isolated OS subsystem. The basic computation services received include virtual memory management, thread creation, and thread synchronization. The equivalent services include at least one of GUI services, application configuration management services, printer services, or audio services.

With respect to process migration, the disclosed architecture uses a pipe disconnectable flag in the manifest to assess whether a process can be migrated. If every pipe from a process is either disconnectable, or the process on the other end can migrate along with the process, then the process may be migrated. By bundling the state and complexity of the GUI into the process itself, a large class of dependencies on the kernel that typically could make migration difficult, are eliminated and replaced with RDP's reconnectable protocol. Disruption by reconnections is tolerated, since many pipes will be to Internet services.

A challenge is plumbing isolated processes to the reference monitor, adapting the NT APIs, repackaging the win32k GUI library, replacing the registry, repackaging COM, and organizing the implementation to facilitate easy migration.

The architecture basic computation API is implemented inside of the isolation monitor 116 (called Dkmon in one implementation).

When Dkmon starts a new process, it creates a suspended Windows process, specifying the dkinit application loader as the binary. The Windows kernel then creates an address space, maps in dkinit and the system-wide ntdll library, and suspends execution at ntdll's entry point. ntdll is the analog of the Unix/lib/ld.so, but in Windows, the kernel installs a particular version of ntdll at the same virtual address in every process, and makes upcalls to functions at fixed offsets into the library. ntdll is modified to make calls. To that end, Dkmon maps DkNtdll into the new process' virtual memory, then patches the system-provided ntdll, overwriting its functions with jumps to DkNtdll; the system library is eviscerated to a jump table.

Dkmon writes a parameter block into the process, communicating initialization parameters such as the paths of the manifest and checkpoint file.

Dkmon resumes the suspended process, causing DkNtdll to set up initial library linkage, including the win32k library, and transfer control to dkinit. Dkinit invokes the loader (DkNtdll) dynamically to load the application and its imported libraries, and jumps to the application's entry point.

To avoid Time-Of-Check-To-Time-Of-Use concurrency vulnerabilities, Dkmon copies in system call arguments exactly once. By reducing the shared application state in the kernel, as well as enforcing coarse isolation policies, exposure to state inconsistency is minimized.

In order to provide binary compatibility with existing desktop applications, user space implementations of many NT kernel functions are provided in the isolated OS subsystems 110. In some cases, such as allocating virtual memory or opening a file, the NT function is a thin layer that calls the isolation monitor 116. In other cases, such as the synchronization mechanisms, the implementation can be more involved.

The NT kernel API exposes several blocking synchronization primitives with varying semantics, including events, mutants (mutexes), and semaphores. Basic features of these synchronization primitives can be implemented with non-blocking locks and user-level data structures. Functionally, synchronization in the user space using blocking semantics is facilitated by providing a wait queue inside the kernel when the user space lock is contended. The signaling mechanism is a pipe. When a process blocks on a synchronization handle, such as a mutant, the process blocks waiting for data to become available in a pipe associated with the event. When a process releases a mutant, the process writes a byte to the pipe and a blocked process is awakened and reads the byte. Only one process will read the byte, so only one process will acquire the mutant.

Several applications wait on one or more timer handles. Dkmon supplies only DkSystemTimeQuery and the ability to block on time via a timeout argument to DkPipeSelect. The application shim library uses DkSystemTimeQuery to normalize relative timeouts to absolute timeouts. The shim provides timer multiplexing by DkPipeSelecting on the earliest timeout among the application-specified handles.

A challenge in porting win from a kernel library to a user space DLL (dynamic linked library) is to reproduce its complicated, multi-process initialization sequence. First, the single, system-wide instance of the win32k module is initialized in kernel space. Second, a csrss-spawned user space process preloads win32k's caches with shared public objects such as fonts and bitmaps. To fetch an object into its cache, win32k makes upcalls to user32 and gdi32 DLLs, so the user-space process first loads those dlls before filling the cache. Third, when an ordinary user process starts, the process loads its own copies of user32 and gdi32, which connect to win32k and provide GUI service.

The architecture bootstrap first loads and initializes its copy of win32k, then loads user32 and gdi32 without calling the respective initializers, and then fills the win32k caches. Now win32k is completely initialized, so the bootstrap calls user32's and gdi32's real library initialization functions. Each DLL has been loaded by the standard loader, so at this point, the bootstrap can request the loader to load the user program, and the program's dependencies on user32 and gdi32 will be satisfied with the extant instances now bound to win32k.

The read-only shared-memory segment established by csrss is now established as a shared heap, since the two components that access it, win32k and user 32, share a protection domain. Synchronization code and shim code is provided to get win32k running in the user space.

Windows' kernel object manager manages a hierarchical namespace, mapping paths to drivers that implement the named objects (analogous to the vnodes that tie files, devices, and /proc together in Unix). The Windows registry is an object manager instance that provides a hierarchical key-value store. The disclosed architecture refactors the OS relationship to make applications self-contained. Thus, the NT shim supplies a registry implementation with no transactions and coarse locking. Each application has a private registry image generated by running the application in Windows. The instrumentation records the set of opened keys, snapshots the values in the Windows registry, and emits a registry image.

Refactoring the COM (component object model) subsystem follows the same basic pattern: application-side libraries expect to communicate with a separate server process. An instance of the server code is linked as isolated OS subsystems 110 library inside the process, and a thread is created to run it. The application-side library is linked directly to the server, cutting out the RPC (remote procedure call) stubs.

Migration can be implemented entirely in user space by tracking the layout of the address space, threads, and handles in user space. To checkpoint an application, the contents of the address space (including this bookkeeping) are written to a file. In order to initiate a checkpoint, the reference monitor writes a bit into the loader block. Each thread checks this bit before issuing a system call and periodically while waiting on input from a pipe. Each thread then checkpoints its register state and terminates without deleting its stack. The last thread to exit actually performs the copy of the address space into the file.

In order to resume from a checkpoint, the application performs basic loader initialization steps, then loads the checkpoint file. The resuming application then restores all anonymous (non-file backed) memory, followed by the private handles, and finally restores file mappings. Externally visible handles are loaded by the manifest as usual. The application then recreates the threads, forming thread execution blocks (TEB) to ensure thread identifiers match those in the checkpointed image. By moving process abstractions into the process itself, the architecture makes the migration task straightforward.

Again, with respect to inter-process communications, the application manifest specifies whether a channel can be broken; processes with unbreakable connections are migrated together. The disclosed architecture makes connections to hardware resources, such as the window manager, stateless and thereby supports disconnection and reconnection without loss of function, and allows independent migration of application logic and the graphical user interface.

In addition to migrating a process' address space and IPC connections, state stored inside the operating system is also migrated. The disclosed architecture migrates processes across disjoint operating systems with matching ABIs. This is made possible by making all inter-process communication channels explicit and minimizing OS state that needs to be tracked and restored, thereby enabling the migration of processes entirely at user-level.

A minimal exemplary computation interface utilized for the sandboxed environment is described as follows.

```
// Virtual Memory
DKSTATUS
DkVirtualMemoryAllocate(
    __inout PVOID *BaseAddress,
    __inout PSIZE_T RegionSize,
    __in ULONG AllocationType,
    __in ULONG Protect);
DKSTATUS
DkVirtualMemoryFree(
    __in PVOID BaseAddress,
    __in SIZE_T RegionSize,
    __in ULONG FreeType);
DKSTATUS
DkVirtualMemoryProtect(
    __inout PVOID BaseAddress,
    __inout SIZE_T RegionSize,
    __in ULONG NewProtect,
    __out PULONG OldProtect);
// IPC
BOOL
DkPipeFork(
    __in HANDLE Handle,
    __out PULONG64 Token,
    __out PHANDLE NewHandle);
BOOL
DkSelfPipeCreate(
    __out PHANDLE Handle1,
    __out PHANDLE Handle2,
    __out PULONG64 Token);
ULONG
DkPipeRead(
    __in HANDLE Handle,
    __in BOOL Async,
    __in PVOID AsyncToken,
    __inout PVOID *Buffer,
    __in ULONG Length,
    __in_opt PLONG64 Timeout);
ULONG
DkPipeWrite(
    __in HANDLE Handle,
    __in BOOL Async,
```

```
            __in PVOID AsyncToken,
            __in PVOID Buffer,
            __in ULONG Length);
ULONG
DkPipeSelect(
        __in ULONG Count,
        __in const HANDLE *Handles,
        __in__opt PLONG64 Timeout);
ULONG
DkPipePeek(
        __in HANDLE Handle);
// Isolated File Access
PVOID
DkFileOpen(
        __in PUNICODE_STRING pUri,
        __in__opt PVOID DesiredAddress,
        __in ACCESS_MASK DesiredAccess,
        __in ULONG ShareMode,
        __in ULONG CreateDisposition,
        __in ULONG CreateOptions,
        __in SIZE_T Offset,
        __inout__opt PSIZE_T ViewSize);
BOOL
DkFileTruncate(
        __in PUNICODE_STRING Uri,
        __in SIZE_T Length);
DKSTATUS
DkFileUnmap(
        __in PVOID addr);
BOOL
DkFileSync(
        __in PVOID addr);
BOOL
DkFileUnlink(
        __in PUNICODE_STRING Uri);
DKSTATUS
DkFileAttributesQuery(
        __in PUNICODE_STRING Uri,
        __out PDK_FILE_ATTRIBUTES Attrs);
// Threading
BOOL
DkThreadCreate(
        __in SIZE_T StackSize,
        __in PDK_THREAD_START Address,
        __in__opt PVOID Parameter,
        __in ULONG CreationFlags,
        __out__opt PHANDLE Pipe,
        __out__opt PULONG64 PipeToken);
VOID
DkThreadExit( );
BOOL
DkProcessCreate(
        __in__opt PUNICODE_STRING Appl,
        __in__opt PUNICODE_STRING CmdLin,
        __out__opt PHANDLE Pipe,
        __out__opt PULONG64 PipeToken);
VOID
DkProcessExit( );
// Other
BOOL
DkSystemTimeQuery(
        __out PLONG64 SystemTime);
BOOL
DkRandomBitsRead(
        __in out PVOID Buf,
        __in SIZE_T BufSize);
BOOL
DkDebugOutput(
        __in PUNICODE_STRING Message);
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
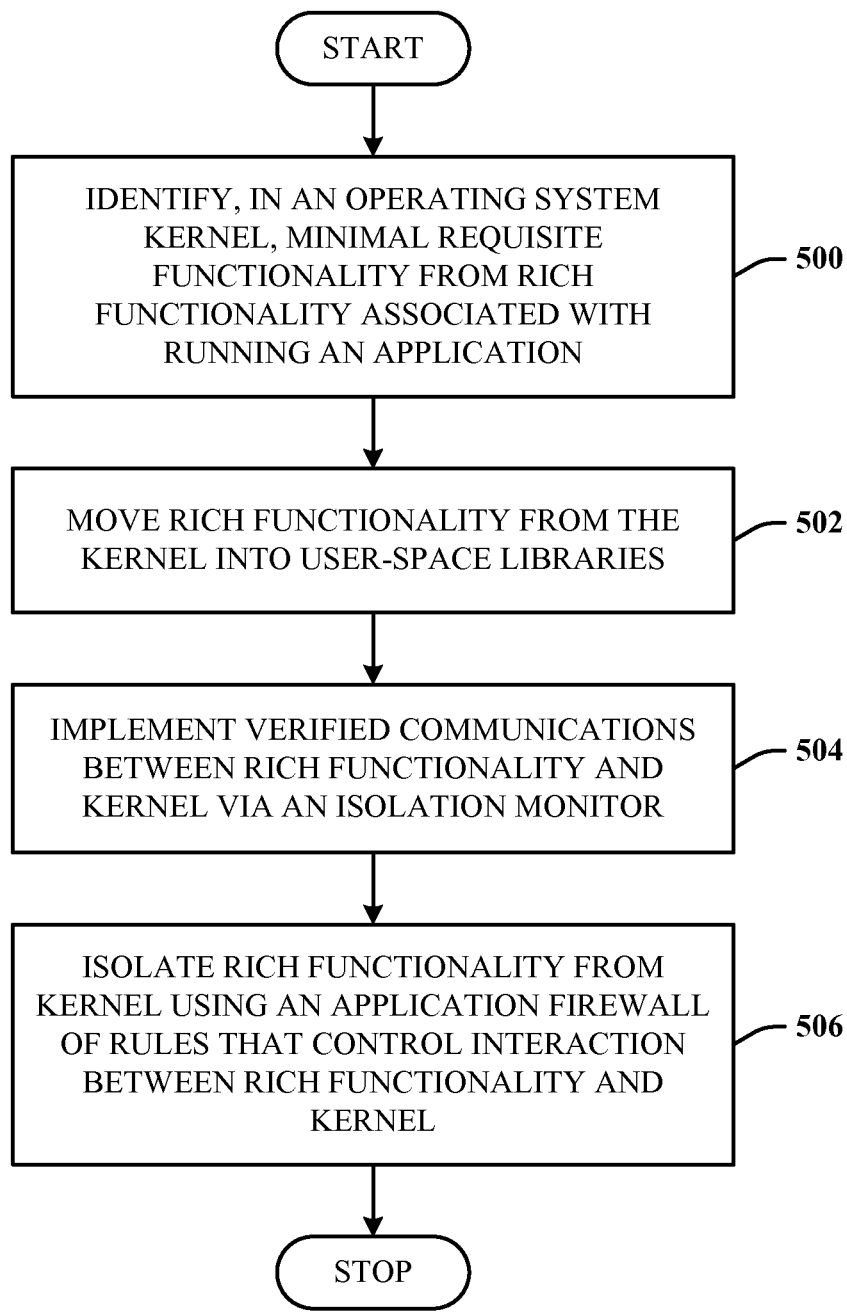
FIG. 5 illustrates a method of creating a secure application execution system in accordance with the disclosed architecture.

FIG. 5 illustrates a method of creating secure application execution in accordance with the disclosed architecture. At 500, in an operating system kernel, identify rich (non-minimal) functionality from minimal requisite functionality (the basic computation services 206) associated with running an application. The minimal requisite functionality is identified and exposed to the applications through the isolation monitor. At 502, the rich functionality is moved from the kernel into user-space libraries (e.g., in the isolated OS subsystems). At 504, communications between the rich functionality and the kernel is implemented via an isolation monitor. At 506, the rich functionality is isolated from the kernel using an application firewall of rules that control interaction between the functionality and the kernel (and other components such as the user I/O client).

Figure 6:
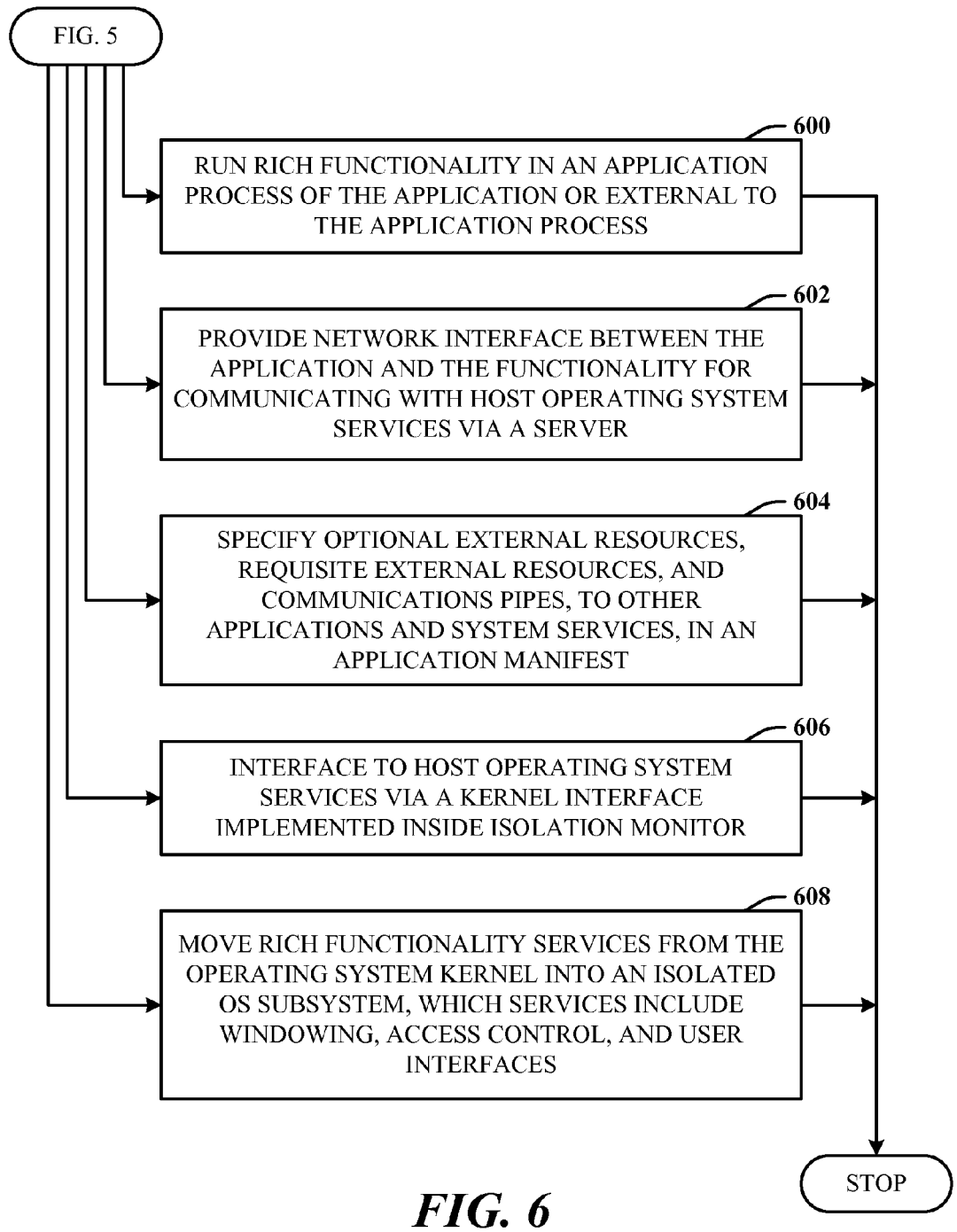
FIG. 6 illustrates further aspects of the method of FIG. 5.

FIG. 6 illustrates further aspects of the method of FIG. 5 for converting additional non-isolated OS subsystems either into isolated OS subsystems or into external network service, such as the user I/O client. Note that the arrowing indicates that each block represents a step that can be included, separately or in combination with other blocks, as additional aspects of the method represented by the flow chart of FIG. 5. At 600, the rich functionality is run in an application process of the application or external to the application process. At 602, a network interface is provided between the application and the functionality for communicating with host operating system services via a server. At 604, optional external resources, requisite external resources, and communications pipes, to other applications and system services, are specified in an application manifest. At 606, an interface to host operating system services is via a kernel interface implemented inside the isolation monitor. At 608, rich functionality services are moved from the operating system kernel into an isolated OS subsystem, which services include windowing, access control, and user interfaces.

Figure 7:
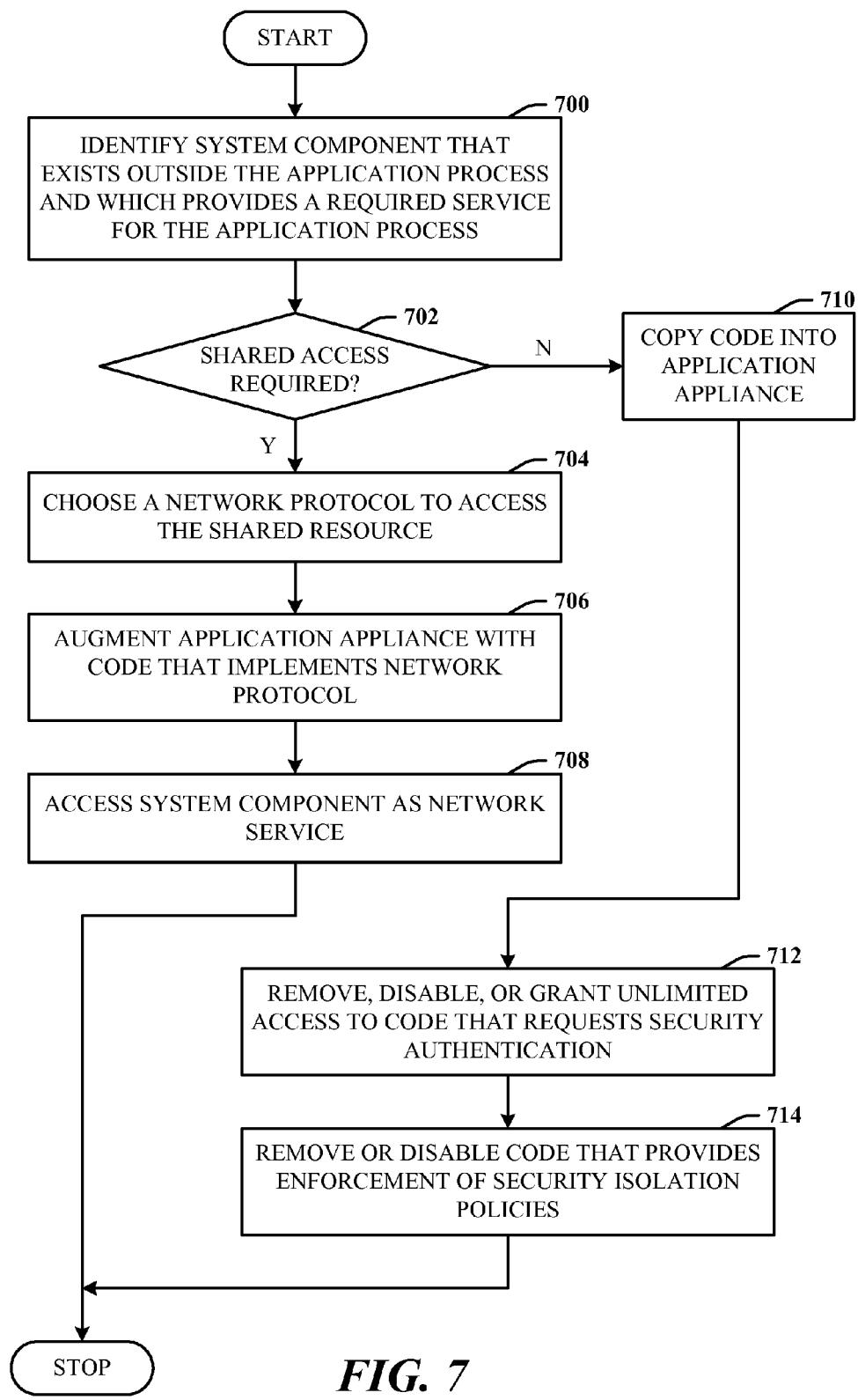
FIG. 7 illustrates a method of factoring operating system code into components to be used in an application appliance environment.

FIG. 7 illustrates a method of factoring operating system code into components to be used in an application appliance environment. At 700, a system component that exists outside the application process and which provides a required service for the application process is identified. At 702, a check is made if the resources managed by the component need to be shared. If so, flow is to 704 where a network protocol is chosen to be used to access the shared resource. Flow is then to 706, where the application appliance is augmented with code that implements the network protocol. At 708, the system component is then accessed as a network service.

If, at 702, the resources exposed by the system component do not need to be shared with other applications, then, flow is to 710, where the code is copied into the application appliance. For example, the physical keyboard, mouse, and video display are shared devices; thus, in one embodiment, the remote desktop protocol (RDP) can be employed to access the shared display at 704 and add RDP server support to the remote user I/O server in step 706 before modifying the Win32k part of the isolated OS subsystems to use the RDP server code introduced in step 704.

At 712, as the component is copied into the application appliance, any code that requests security authentication can be removed, disabled, or modified to grant access. At 714, as the component is copied into the application appliance, any code that provides enforcement of security isolation policies can be removed or disabled. The code can be removed or disabled (or modified to grant access), because the code is now inside the application appliance, and therefore, will not protect any other services from an errant or malicious application appliance.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
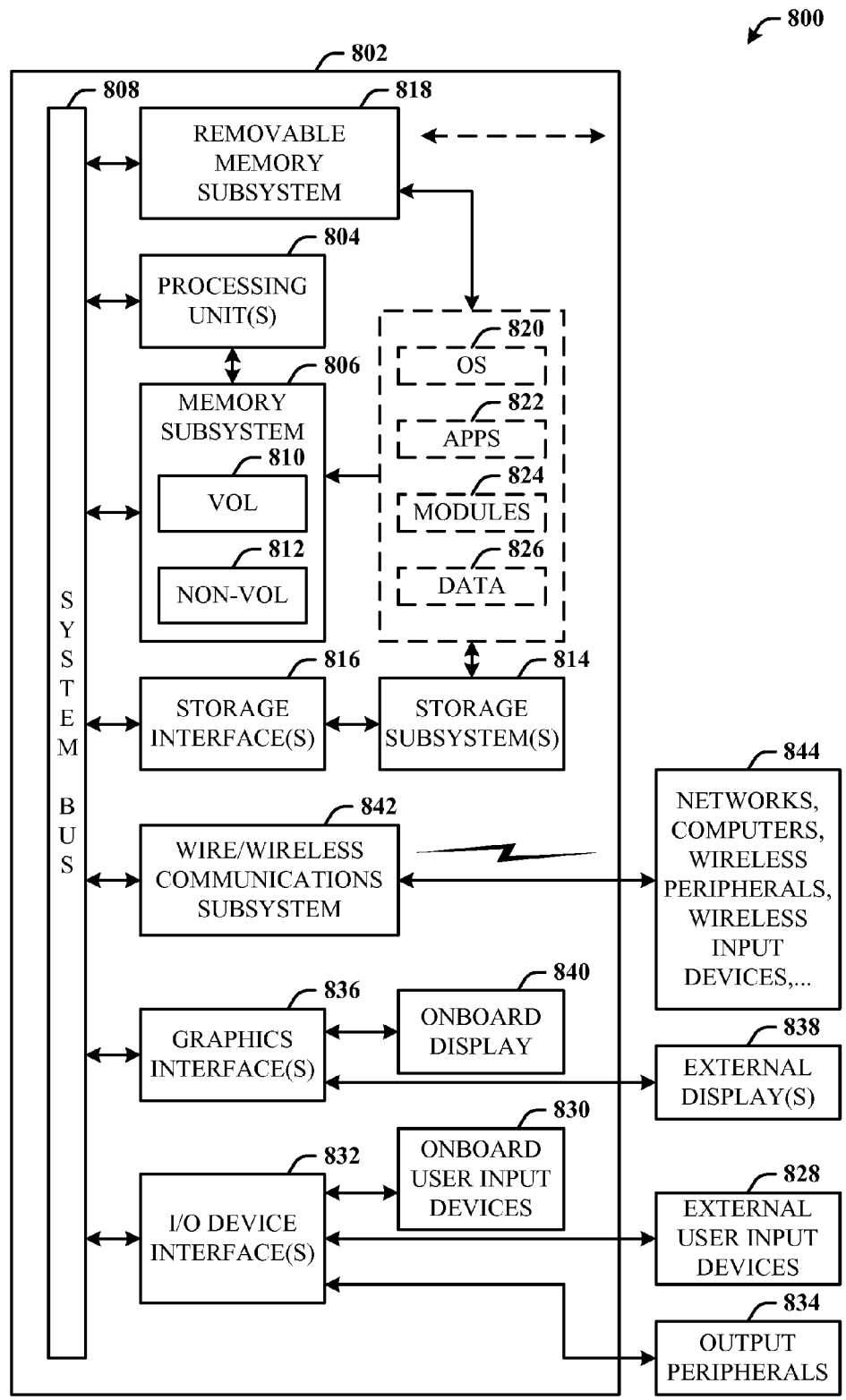
FIG. 8 illustrates a block diagram of a computing system that executes application sandboxing in accordance with the disclosed architecture.

Referring now to FIG. 8, there is illustrated a block diagram of a computing system 800 that executes application sandboxing in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820 (e.g., OS 108 and OS 308), one or more application programs 822 (e.g., isolated application 104, non-isolated application 106, and isolated application 404), other program modules 824 (e.g., isolated application libraries 118 and non-isolated application libraries 120), and program data 826.

The one or more application programs 822, other program modules 824, and program data 826 can include the entities and components of the system 100 of FIG. 1, entities and components of the system 200 of FIG. 2, the entities and components of FIG. 3, the entities and components of the system 400 of FIG. 4, and the methods represented by the flowcharts of FIGS. 5-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
one or more computer readable media storing executable instructions; and
one or more processing units configured to execute the executable instructions, wherein the executable instructions cause the one or more processing units to:
execute, in a first application process, a non-isolated application,
execute, in an isolation container comprising a second application process, an isolated application in isolation from the non-isolated application, wherein the isolated application and the non-isolated application both execute in association with a single operating system (OS),
provide OS services to the isolated application using an isolated OS subsystem of the isolation container, wherein the isolated OS subsystem comprises the OS services for the isolated application and wherein the isolated OS subsystem runs in the second application process with the isolated application,
provide the OS services to the non-isolated application using a non-isolated OS subsystem of the OS,
perform basic computation services for the isolated application and the non-isolated application, wherein the basic computation services are provided by the OS in one or more other processes that do not include the first application process and do not include the second application process,
wherein the non-isolated OS subsystem is configured to execute outside of the isolation container, and
wherein the OS services include at least one of a graphical user interface (GUI) service, an application configuration management service, a printer service, or an audio service.

2. The system of claim 1, wherein the basic computation services include at least one of virtual memory management, thread creation, or thread synchronization.

3. The system of claim 2, wherein the executable instructions further cause the one or more processing units to:
execute an isolation monitor configured to provide the isolated application with access to the basic computation services.

4. The system of claim 3, wherein the isolated OS subsystem is configured to receive the basic computation services through the isolation monitor.

5. The system of claim 3, wherein the isolation monitor is configured to employ a collection of rules that map from an application manifest to approval or denial of resource requests, wherein the manifest defines resources outside the isolation container that are available to the isolated application.

6. The system of claim 2, wherein the basic computation services include the virtual memory management, the thread creation, and the thread synchronization.

7. The system of claim 1, wherein the OS services include the GUI service.

8. The system of claim 1, wherein the executable instructions cause the one or more processing units to:
provide the isolated application with a remote user input/output (I/O) server that communicates with a user I/O client outside the isolation container.

9. The system of claim 1, wherein the executable instructions further cause the one or more processing units to:
migrate the isolated application to a separate system by reading from some or all of an address space of the isolation container.

10. A method performed by one or more processing units of a computing system, the method comprising:
providing a first application process to a non-isolated application that executes in the first application process;
providing an isolation container comprising a second application process to an isolated application that executes in the isolation container, wherein the isolation container isolates the isolated application from the non-isolated application;
providing operating system services to the isolated application using an isolated operating system subsystem of the isolation container, wherein the isolated operating system subsystem comprises the operating system services for the isolated application and wherein the isolated operating system subsystem executes in the second application process with the isolated application;
providing the operating system services to the non-isolated application using a non-isolated operating system subsystem that executes outside of the isolation container, wherein the operating system services provided to the isolated application and the non-isolated application include at least one of a graphical user interface (GUI) service, an application configuration management service, a printer service, or an audio service; and
performing basic computation services for the isolated application and the non-isolated application in one or more other processes that do not include the first application process and do not include the second application process.

11. The method of claim 10, wherein the operating system services provided to the isolated application and the non-isolated application include the GUI service and the GUI service displays windows or directs device input to specific windows.

12. The method of claim 11, wherein the device input comprises keyboard input or mouse input.

13. The method of claim 10, wherein equivalent operating system services are provided to the isolated application and the non-isolated application.

14. The method of claim 10, wherein the operating system services provided to the isolated application and the non-isolated application are from a single operating system.

15. The method of claim 10, further comprising migrating the second application process from the computing system to another computing system.

16. A computer memory storing computer-executable instructions that, when executed by one or more processing units of a computing system, cause the one or more processing units to perform acts comprising:
providing a first application process to a non-isolated application that executes in the first application process;
providing an isolation container comprising a second application process to an isolated application that executes in the isolation container, wherein the isolation container isolates execution of the isolated application from execution of the non-isolated application;
providing operating system services to the isolated application using an isolated operating system subsystem of the isolation container, wherein the isolated operating system subsystem comprises the operating system services for the isolated application and wherein the isolated operating system subsystem executes in the second application process with the isolated application;
providing the operating system services to the non-isolated application using a non-isolated operating system subsystem that executes outside of the isolation container, wherein the operating system services provided to the isolated application and the non-isolated application include at least one of a graphical user interface (GUI) service, an application configuration management service, a printer service, or an audio service; and
performing basic computation services for the isolated application and the non-isolated application in one or more other processes that do not include the first application process and do not include the second application process.

17. The computer memory of claim 16, embodied as a solid state memory.

18. The computer memory of claim 16, the acts further comprising:
transferring the second application process to another computing system, including sending an address space of the second application process and operating system state to the another computing system.

* * * * *